(12) United States Patent
Kaneko et al.

(10) Patent No.: US 9,950,583 B2
(45) Date of Patent: Apr. 24, 2018

(54) SPRING SEAT

(71) Applicant: Showa Corporation, Gyoda (JP)

(72) Inventors: Kenichiro Kaneko, Gyoda (JP); Io Nagata, Gyoda (JP)

(73) Assignee: SHOWA CORPORATION, Gyoda (JP)

(*) Notice: Subject to any disclaimer, the term of this patent is extended or adjusted under 35 U.S.C. 154(b) by 0 days.

(21) Appl. No.: 15/061,332

(22) Filed: Mar. 4, 2016

(65) Prior Publication Data

US 2016/0185177 A1  Jun. 30, 2016

Related U.S. Application Data

(63) Continuation of application No. PCT/JP2014/073338, filed on Sep. 4, 2014.

(30) Foreign Application Priority Data

Sep. 6, 2013 (JP) ................................ 2013-185525

(51) Int. Cl.
*B60G 15/06* (2006.01)
*F16F 9/32* (2006.01)

(52) U.S. Cl.
CPC .......... *B60G 15/063* (2013.01); *F16F 9/3235* (2013.01); *B60G 2202/312* (2013.01); *B60G 2204/1242* (2013.01); *B60G 2204/12422* (2013.01)

(58) Field of Classification Search
CPC .......... B60G 15/062; B60G 15/063; B60G 2202/30; B60G 2202/31; B60G 2202/312; B60G 2204/124; B60G 2204/1242; B60G 2204/12422; F16F 9/3235; F16F 1/12; F16F 1/128

USPC .................. 267/221; 280/124.164, 124.179
See application file for complete search history.

(56) References Cited

U.S. PATENT DOCUMENTS

| 5,947,459 A * | 9/1999 | Ducloux .............. B60G 15/063 267/221 |
| 6,079,700 A | 6/2000 | Solomond et al. |
| 6,155,544 A * | 12/2000 | Solomond .............. B60G 11/52 267/170 |
| 6,398,201 B1 * | 6/2002 | Solomond ............ B60G 15/063 267/170 |
| 8,382,080 B2 * | 2/2013 | Suchta .................... F16F 1/368 188/321.11 |

(Continued)

FOREIGN PATENT DOCUMENTS

| CN | 102202922 A | 9/2011 | |
| DE | 102010028290 A1 * | 11/2011 | ........... B60G 15/063 |

(Continued)

OTHER PUBLICATIONS

EPO machine translation, DE 10 2010 028 290 A1, Nov. 2011.*

(Continued)

*Primary Examiner* — Thomas J Williams
(74) *Attorney, Agent, or Firm* — Leason Ellis LLP

(57) ABSTRACT

A lower spring seat 31 is mounted on a cylinder including a damper device to support a wheel-side end portion of a coil spring 30 disposed between a vehicle body and a wheel. The lower spring seat 31 includes: a mounting portion on which the wheel-side end portion of the coil spring 30 rests; and an enlarged diameter portion disposed on a side of the mounting portion opposite to the cylinder 10 and disposed between the coil spring 30 and the wheel. The mounting portion and the enlarged diameter portion are each made of a resin material.

9 Claims, 37 Drawing Sheets

(56) References Cited

U.S. PATENT DOCUMENTS

| | | | | |
|---|---|---|---|---|
| 2002/0158393 A1* | 10/2002 | Handke | ................ | B60G 13/003 |
| | | | | 267/221 |
| 2003/0218286 A1* | 11/2003 | Miyazaki | ................ | B60G 11/52 |
| | | | | 267/220 |
| 2016/0023529 A1* | 1/2016 | Wilkin | ................ | B60G 15/063 |
| | | | | 267/221 |
| 2016/0137017 A1* | 5/2016 | Wilkin | ................ | B60G 15/063 |
| | | | | 267/221 |

FOREIGN PATENT DOCUMENTS

| | | | |
|---|---|---|---|
| JP | 55-046802 U | 9/1978 | |
| JP | 07-036711 U | 7/1995 | |
| JP | 11-294511 A | 10/1999 | |
| JP | 2005-256963 A | 9/2005 | |
| JP | 2009-056852 A | 3/2009 | |
| JP | 2010-144872 A | 7/2010 | |
| JP | 2010-164071 A | 7/2010 | |
| WO | WO 2016070905 A1 * | 5/2016 | ........... B29C 70/543 |

OTHER PUBLICATIONS

International Search Report dated Oct. 28, 2014 for the corresponding PCT Application No. PCT/JP2014/073338.
Office Action dated Dec. 2, 2016 for the corresponding Chinese Patent Application No. 201480049302.6.
Office Action dated Jun. 13, 2017 for the corresponding Japanese Patent Application No. 2013-185525.

* cited by examiner

Vertical direction (axial direction)

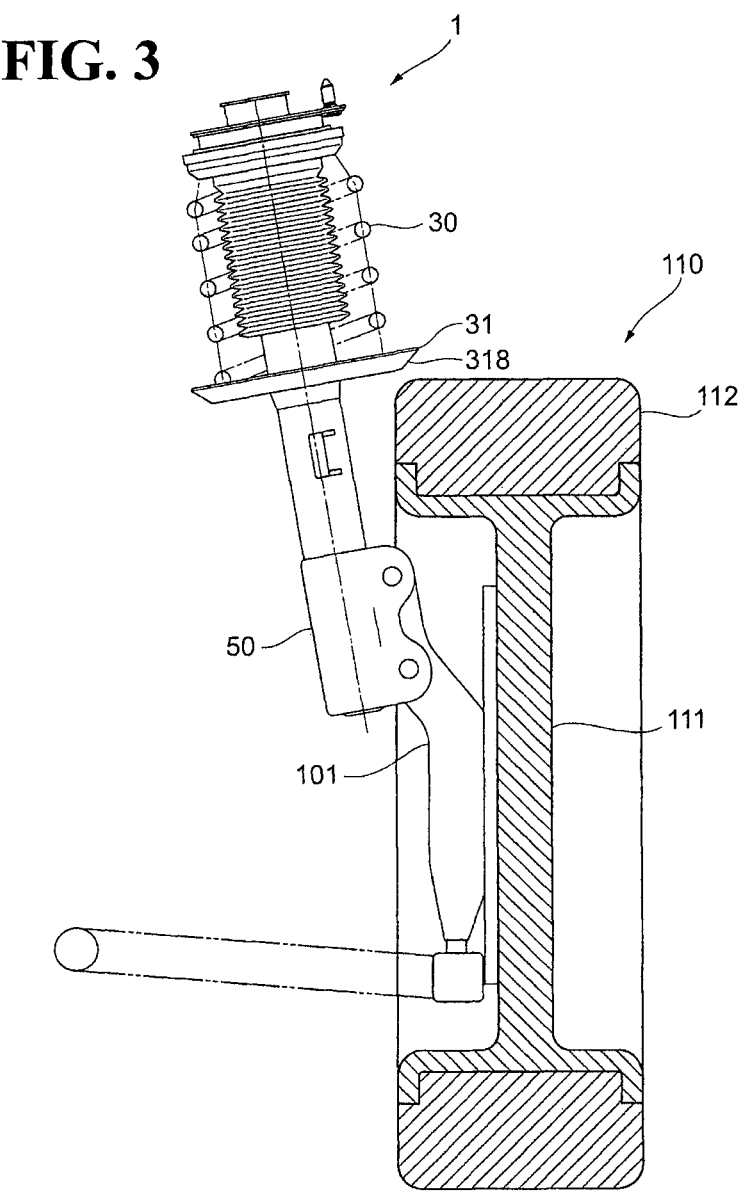

Vertical direction (axial direction)

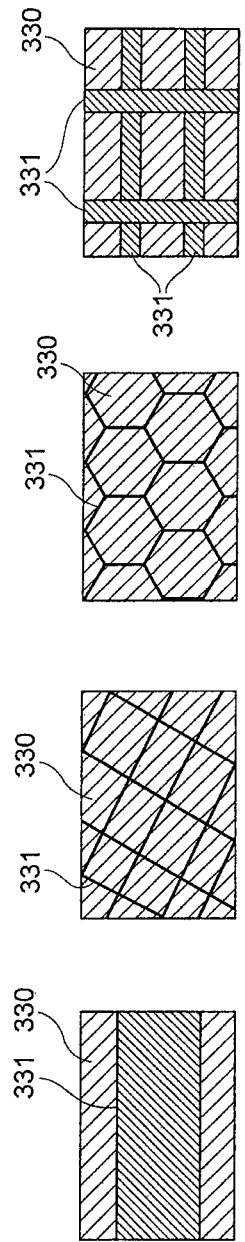

Vertical direction (axial direction)

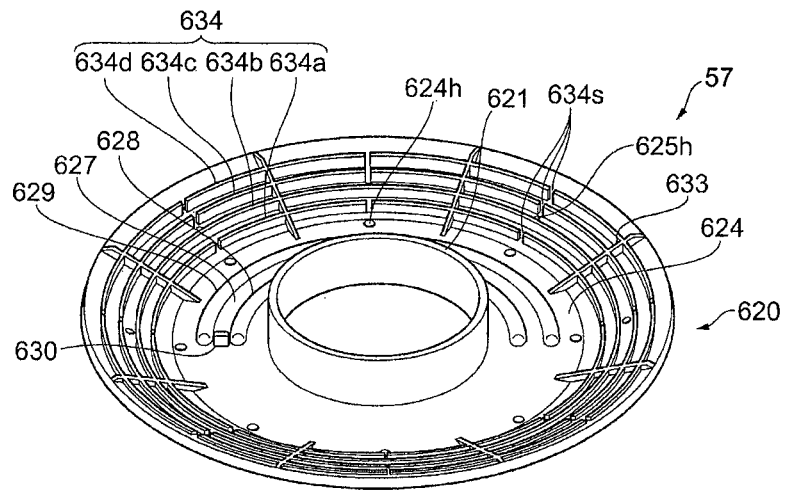
FIG. 28(a)
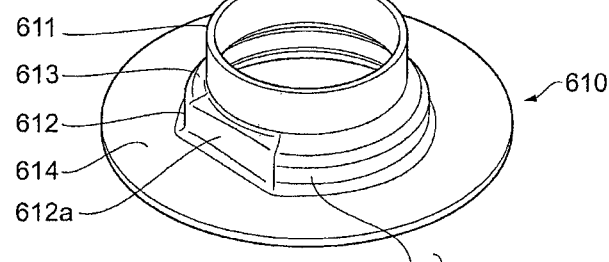
FIG. 28(b)
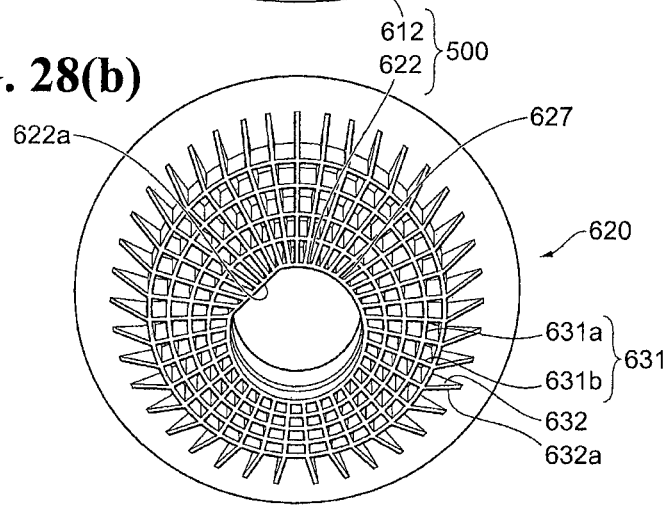

SPRING SEAT

CROSS REFERENCE TO RELATED APPLICATION

This is a continuation of International Application No. PCT/JP2014/073338 filed on Sep. 4, 2014, and claims priority from Japanese Patent Application No. 2013-185525 filed on Sep. 6, 2013, the entire disclosures of which are incorporated herein by reference.

TECHNICAL FIELD

The present invention relates to a spring seat for receiving a compressive load from a spring that is provided in a suspension.

BACKGROUND ART

Conventionally, a technique is proposed to use a metal spring seat to receive a compressive load from a coil spring provided in a suspension (suspension).

For example, patent document 1 discloses the following contents. FIG. 16 is a diagram illustrating a schematic configuration of a suspension 4 disclosed in patent document 1. As illustrated in FIG. 16, the suspension 4 of a vehicle disclosed in patent document 1 includes a metal coil spring 20 and a metal spring seat 18, which is fixed at a shock absorber 12 to receive a compressive load from the coil spring 20. The spring seat 18 disclosed in patent document 1 has so small a portion disposed between the coil spring 20 and a wheel 3 that when the coil spring 20 is broken, there is no function to keep fragments of the coil spring 20 off the wheel 3.

Patent document 1: Japanese Unexamined Patent Application Publication No. 2010-144872.

SUMMARY OF THE INVENTION

In order to reduce the weight of the suspension, it is desirable to reduce the weight of the spring seat. If the spring seat is made of metal, however, it is difficult to reduce the weight. Moreover, in order to ensure safety, when the spring supported by the spring seat is broken, it is desirable to prevent fragments of the spring from coming off onto the wheel.

The present invention has an object to provide a spring seat that is reduced in weight and prevents the spring from coming off onto the wheel if the spring is broken.

In view of the above object, a spring seat according to the present invention is mounted on a cylinder including a damper device to support a wheel-side end portion of a spring disposed between a vehicle body and a wheel. The spring seat includes: a mounting portion on which the wheel-side end portion of the spring rests; and an intermediate portion disposed on a side of the mounting portion opposite to the cylinder and disposed between the spring and the wheel. The mounting portion and the intermediate portion are each made of a resin material. The mounting portion on which the wheel-side end portion of the spring rests and the intermediate portion disposed between the spring and the wheel are each made of a resin material. This configuration makes the spring seat lighter than mounting portions and intermediate portions made of metal. The intermediate portion is disposed between the spring and the wheel. This configuration ensures that even if the spring is broken, the broken spring is prevented from coming off onto the wheel.

The mounting portion is made of resin. This configuration eliminates the need for providing an elastic member between the mounting portion and the spring, whereas an elastic member is necessary when the mounting portion is made of metal so as to prevent sound caused by contact between the mounting portion and the spring.

The present invention provides a spring seat that is reduced in weight and prevents the spring, when broken, from coming off.

BRIEF DESCRIPTION OF THE DRAWINGS

FIG. 3 is a schematic view of the suspension according to the embodiments mounted on a wheel.

FIGS. 10(a), 10(b), 10(c) and 10(d) are views of modifications of the strengthening member, and cross-sectional views taken along the line VIIIc-VIIIc in FIG. 8(a).

FIG. 28(a) is a perspective view of the metal seat and the resin seat seen from above, and FIG. 28(b) is a perspective view of the resin seat seen from below.

DESCRIPTION OF THE REFERENCE NUMERAL

1 . . . Suspension, 10 . . . Cylinder, 20 . . . Piston rod, 30 . . . Coil spring, 31, 32, 33, 34, 55, 56, 57, 58 and 59 . . . Lower spring seat, 50 . . . Wheel-side mounting bracket, 70, 71 and 72 . . . Reinforcing member, 320 and 340 . . . Lower spring seat body, 330 . . . Reinforcing portion, 331 . . . Strengthening member, 510, 540, 610, 640 and 660 . . . Metal seat, 520, 550, 620, 650, and 670 . . . Resin seat

DETAILED DESCRIPTION OF THE INVENTION

With reference to the accompanying drawings, a mode for carrying out the present invention will be described in detail below.

Figure 1:
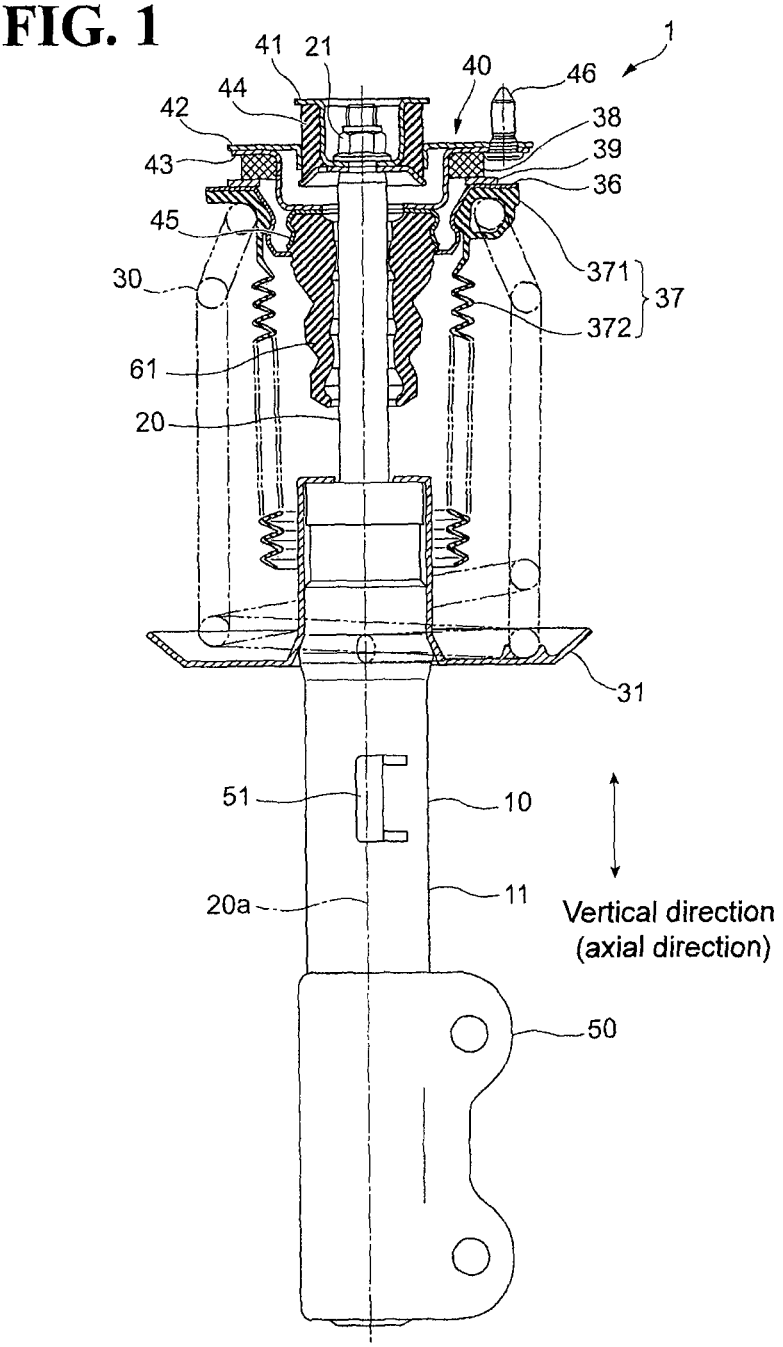
FIG. 1 is a view of a suspension according to embodiments illustrating a schematic configuration of the suspension.

FIG. 1 is a view of a schematic configuration of a suspension 1 according to the embodiments.

The suspension 1 is a MacPherson strut suspension, and includes, as illustrated in FIG. 1, a cylinder 10, which contains a damper device (not illustrated), and a piston rod 20, which supports a piston (not illustrated) built in the cylinder 10.

The cylinder 10 includes a thin-walled hollow circular columnar outer cylinder 11, in which a thin-walled hollow circular columnar inner cylinder (not illustrated), the piston that reciprocates in the inner cylinder, and a plurality of valve systems that generate a damping force are built. The piston rod 20 is a solid circular columnar member or a hollow circular columnar member. The piston (not illustrated) to be incorporated in the cylinder 10 is mounted on the end portion side in a central line direction of the solid circular column or the hollow circular column, and a nut 21 is mounted on the other side in the central line direction. In the following description, the direction of the central axis 20a of the piston rod 20 (the central line direction of the solid circular column or the hollow circular column) may be simply referred to as a "vertical direction".

The suspension 1 includes: a coil spring 30, which is disposed on the outside of the cylinder 10; a lower spring seat 31, which is mounted on the outer periphery of the cylinder 10 to support the lower end portion of the coil spring 30; an upper spring seat 36, which is mounted on the other end portion side in the central line direction to support the upper end portion of the coil spring 30; and an upper seat rubber 37, which is interposed between the coil spring 30 and the upper spring seat 36. The coil spring 30 is a compression spring having a coil shape formed by bending left-handed a metal wire having a circular cross-section with ½ end turn at both end portions of the coil. The lower spring seat 31 will be described in detail later. In the embodiments, the upper seat rubber 37, as illustrated in FIG. 1, is integrally molded so as to be continuous between an annular circular ring portion 371, which has an annular circular shape and is interposed between the upper end portion of the coil spring 30 and the upper spring seat 36, and a bellows-shaped dust cover 372, which extends from the lower end portion of the annular circular ring portion 371 to the lower direction.

The suspension 1 includes: a vehicle body-side mounting bracket 40, which is mounted on the upper end portion side of the piston rod 20 for mounting the suspension 1 on a vehicle; a wheel-side mounting bracket 50, which is fixed to the lower end portion side of the cylinder 10 for mounting the suspension 1 at the wheel; and a stabilizer mounting arm 51, which is fixed to a central part in the vertical direction of the cylinder 10 for connecting an end portion of a stabilizer (not illustrated). The suspension 1 further includes: an annular bearing 38, which is disposed between the upper spring seat 36 and a lower mount base 43, described later, of the vehicle body-side mounting bracket 40; and an annular metal plate 39, which is welded on the upper spring seat 36 and interposed between the upper spring seat 36 and the bearing 38.

The vehicle body-side mounting bracket 40 includes: a stay 41, which includes a concave member and a convex member aligned vertically; an upper mount base 42 and the lower mount base 43, which are aligned vertically; and a mount rubber 44, which is disposed between the stay 41 and the upper mount base 42. On the lower surface of the lower mount base 43, a convex bump rubber holding member 45 is welded so as to hold a bump rubber 61, which will be described later. The stay 41 is inserted into the upper end portion of the piston rod 20 and is fastened with the nut 21, and thus the vehicle body-side mounting bracket 40 is mounted on the piston rod 20. The vehicle body-side mounting bracket 40 is further mounted on the vehicle body with a bolt 46, which penetrates the upper mount base 42 and the lower mount base 43.

The suspension 1 further includes the bump rubber 61, which surrounds the outer periphery of a portion of the piston rod 20 that protrudes from the cylinder 10. The bump rubber 61 is formed so that an outer diameter gradually increases from the lower end portion (the wheel side) to the upper end portion (the vehicle side). The upper end portion is fitted into the bump rubber holding portion 45 of the vehicle body-side mounting bracket 40, so as to be held by the vehicle body-side mounting bracket 40.

The suspension system 1 configured as described above expands and contracts so as to absorb impact that a vehicle receives from a road surface using repulsive force of the coil spring 30. At the time of reciprocation of the piston (not illustrated) accompanied by the expansion and contraction of the suspension 1, the suspension 1 utilizes damping force generated by the damper device built in the cylinder 10 to prevent the vibration generated by expansion and contraction.

First Embodiment

The lower spring seat 31 according to a first embodiment will be described.

Figure 2A:
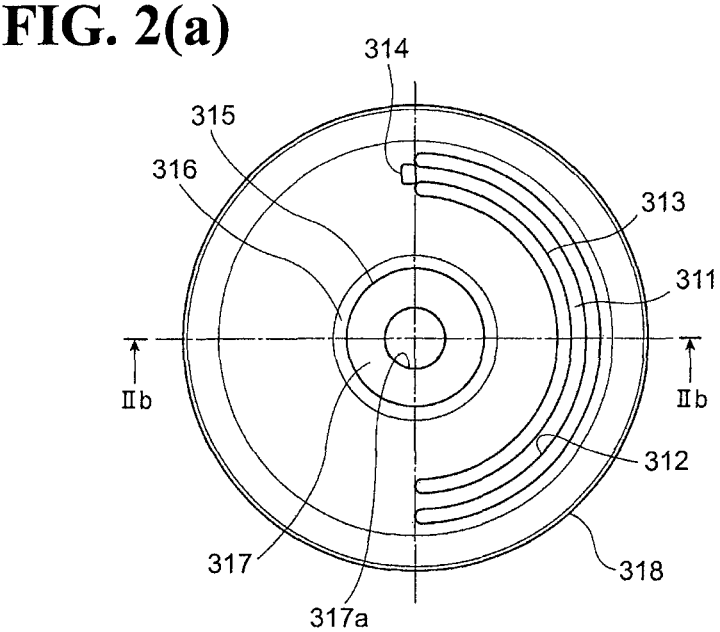
FIGS. 2(a) and 2(b) are views of a lower spring seat according to a first embodiment illustrating a schematic configuration of the lower spring seat.
Figure 2B:
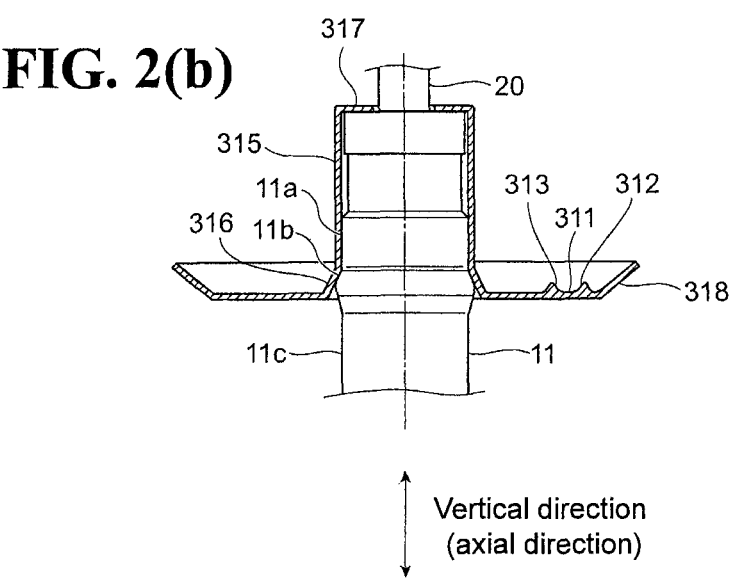

FIG. 2(a) and FIG. 2(b) are views the lower spring seat 31 according to the first embodiment illustrating a schematic configuration of the lower spring seat 31. FIG. 2(a) is a view of the lower spring seat 31 seen from above. FIG. 2(b) is a cross-sectional view taken along the line IIb-IIb in FIG. 2(a). FIG. 2(b) illustrates a part of the shape of the outer cylinder 11 of the cylinder 10, to which the lower spring seat 31 is mounted.

The lower spring seat 31 includes a mounting portion 311, on which the lower end portion of the coil spring 30 rests. The lower spring seat 31 includes an outer prevention portion 312, which is disposed outside the mounting portion 311 and protrudes upwardly from the mounting portion 311 to prevent the lower end portion of the coil spring 30 from moving radially outward. The lower spring seat 31 also includes an inner prevention portion 313, which is disposed inside the mounting portion 311 and protrudes upwardly from the mounting portion 311 to prevent the lower end portion of the coil spring 30 from moving radially inward. Since the number of end turns of the coil spring 30 according to this embodiment is ½, the lower end portion of the coil spring 30 is in contact with the mounting portion 311 over approximately 180 degrees, and the outer prevention portion 312 and the inner prevention portion 313 prevent the lower end portion of the coil spring 30 from moving over approximately 180 degrees. The lower spring seat 31 includes a rectangular parallelepiped protrusion portion 314, which protrudes upwardly from the mounting portion 311 at a starting point of the outer prevention portion 312 and the inner prevention portion 313. By the contact of the tip of the lower end portion of the coil spring 30 with the protrusion portion 314, the rotation of the coil spring 30 in a circumferential direction is prevented. It should be noted that the angle at which the lower end portion of the coil spring 30 and the mounting portion 311 are brought into contact with each other may be other than 180 degrees.

The lower spring seat 31 includes: a hollow circular columnar portion 315, which has a hollow circular columnar shape and extends in the central line direction; an inclined portion 316, which is inclined with respect to the central line direction from the lowermost end portion of the hollow circular columnar portion 315; and an orthogonal portion 317, which extends inward in a direction perpendicular to the central line direction from the uppermost end portion of the hollow circular columnar portion 315. The inclined portion 316 is inclined so that its diameter increases gradually toward the lower direction. At the orthogonal portion 317, a through hole 317a, through which the piston rod 20 penetrates, is formed.

Here, as illustrated in FIG. 2(b), the outer cylinder 11 of the cylinder 10 includes: a fitting portion 11a, to which the hollow circular columnar portion 315 of the lower spring seat 31 is fitted; and a position determination portion 11b, which determines the position of the lower spring seat 31. The fitting portion 11a is a portion having an outer peripheral surface of a larger outer diameter than the outer diameter of a general outer peripheral surface 11c of the outer cylinder 11. The position determination portion 11b includes a protrusion that protrudes further outward than the fitting portion 11a. An example of the outer cylinder 11 is formed by press-working a metal pipe.

The inner diameter of the hollow circular columnar portion 315 of the lower spring seat 31 and the outer diameter of the fitting portion 11a of the outer cylinder 11 have such a dimensional relationship that the hollow circular columnar portion 315 and the fitting portion 11a are tightly fitted to each other. That is, the lower spring seat 31 is fixed to the outer cylinder 11 by press-fitting the hollow circular columnar portion 315 to the fitting portion 11a. By contacting the inclined portion 316 of the lower spring seat 31 with the position determination portion 11b of the outer cylinder 11, movement of the lower spring seat 31 toward the lower direction is prevented. In other words, at the time when the lower spring seat 31 is being press-fitted to the outer cylinder 11, the press-fitting continues until the inclined portion 316 meets the position determination portion 11b, and this determines the position of the lower spring seat 31 in vertical relation to the position of the outer cylinder 11. Another possible configuration is that the orthogonal portion 317 of the lower spring seat 31 meets the upper end surface of the cylinder 10 to determine the position of the lower spring seat 31 in vertical relation to the position of the outer cylinder 11.

The lower spring seat 31 includes, at its outer peripheral portion further outward than the outer prevention portion 312, an enlarged diameter portion 318, which is an example of the intermediate portion, whose diameter gradually increases toward the upward direction.

FIG. 3 is a schematic view of the suspension 1 according to the embodiments mounted on a wheel. As illustrated in FIG. 3, the suspension 1 is fixed to a wheel 111 of the wheel 110 through an arm 101, which is mounted on the wheel-side mounting bracket 50, and is mounted on the vehicle body through the vehicle body-side mounting bracket 40. With the suspension 1 mounted on the vehicle, the lower spring seat 31 of the suspension 1 is arranged between the coil spring 30 and a tire 112 of the wheel 110. This configuration ensures that even if the coil spring 30 is broken, the enlarged diameter portion 318 of the lower spring seat 31 keeps fragments of the coil spring 30 away from the tire 112. As a result, bursting of the tire 112 caused by the fragments of the coil spring 30 stuck in the tire 112 is prevented.

It is noted that with the suspension 1 mounted on the vehicle, as the wheel 110 rotates, the lower spring seat 31 and the coil spring 30 rotate together with the cylinder 10.

The lower spring seat 31 according to the first embodiment configured as described above is formed of resin.

Examples of the resin include ABS, engineering plastics, polycarbonate, urethane, and nylon.

That is, the lower spring seat 31 according to the first embodiment is a spring seat that is mounted on the cylinder 10, which contains the damper device (not illustrated), to support the end portion on the wheel 110 side of the coil spring 30. The lower spring seat 31 includes: the mounting portion 311, on which the end portion on the wheel 110 side of the coil spring 30 rests; and the enlarged diameter portion 318, which is disposed on a side of the mounting portion 311 opposite to the cylinder 10 and disposed between the coil spring 30 and the wheel 110. In the lower spring seat 31 according to the first embodiment, the mounting portion 311 and the enlarged diameter portion 318 are each made of a resin material. The lower spring seat 31 further includes the outer prevention portion 312 and the inner prevention portion 313, which prevent movement of the coil spring 30, which rests on the mounting portion 311. The outer prevention portion 312 and the inner prevention portion 313 are each made of resin. The lower spring seat 31 is fixed by being press-fitted into the cylinder 10.

The lower spring seat 31 may not be provided with the outer prevention portion 312, the inner prevention portion 313, and the protrusion portions 314.

Forming the lower spring seat 31 of resin makes the weight of the lower spring seat 31 lighter than a lower spring seat 31 made of metal, resulting in a reduction in weight of the suspension 1. Employing a resin as the material of the lower spring seat 31 enables the lower spring seat 31 to be formed into any desired shape in a mold. Therefore, even if the outer prevention portion 312, the inner prevention portion 313, the protrusion portions 314, and other elements necessitate protruding and depressed shapes, these shapes are more easily formed. That is, in the case where the lower spring seat 31 is made of metal, it is necessary to make an uneven surface by pressing a metal plate using a plurality of molds in a plurality of steps. In contrast, the use of a resin as the material of the lower spring seat 31 makes injection molding (injection molding) applicable, and this makes the lower spring seat 31 more easily formed than a lower spring seat 31 made of metal, even if an uneven, complicated shape is required. Furthermore, the use of a resin increases the degree of freedom in the shape of the lower spring seat 31, and thus the shapes of the outer prevention portion 312, the inner prevention portion 313, and the mounting portion 311 between the outer prevention portion 312 and the inner prevention portion 313 are precisely adjusted to the shape of the lower end portion of the coil spring 30. This configuration prevents sand, for example, from entering the space between the coil spring 30 and the lower spring seat 31. If the lower spring seat 31 is made of metal, in order to prevent sound caused by direct contact with the coil spring, it is necessary to provide an elastic member such as a rubber between the lower spring seat and the coil spring. In contrast, in this embodiment, the use of a resin as the material of the lower spring seat 31 eliminates the need for an elastic member.

Second Embodiment

Next, a lower spring seat 32 according to a second embodiment will be described.

Figure 4A:
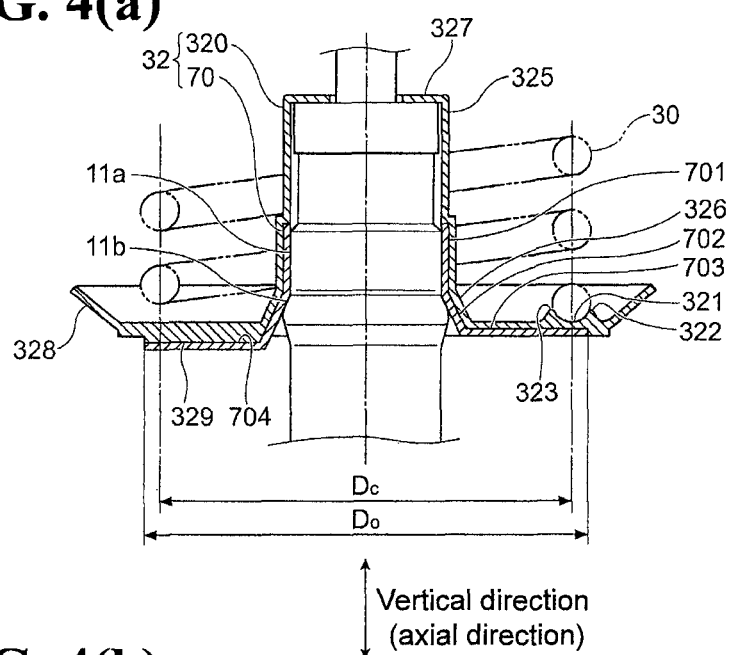
FIG. 4(a) is a cross-sectional view of a lower spring seat according to a second embodiment.
Figure 4B:
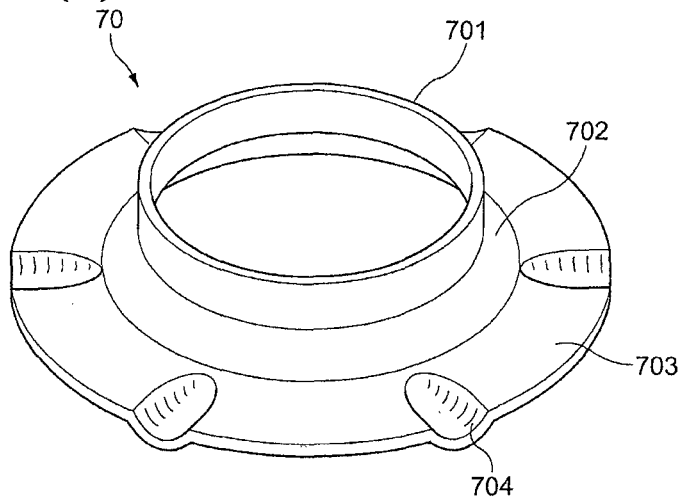
FIG. 4(b) is a view of a reinforcing member illustrating a schematic configuration of the reinforcing member.

FIG. 4(a) is a cross-sectional view of the lower spring seat 32 according to the second embodiment. FIG. 4(b) is a view of a reinforcing member 70, described later, illustrating a schematic configuration of the reinforcing member 70. FIG. 4(a) is a cross-sectional view taken along the line IIb-IIb in FIG. 2(a).

The lower spring seat 32 according to the second embodiment is different from the configuration of the first embodiment in that, in addition to a lower spring seat body 320, which is made of resin, the reinforcing member 70, which is made of metal, is included, and the reinforcing member 70 is interposed between the lower spring seat body 320 and the outer cylinder 11 of the cylinder 10. The following description will focus on respects different from the first embodiment, omitting those respects already described hereinbefore.

The reinforcing member 70 includes: a hollow circular columnar portion 701, which has a hollow circular columnar shape and extends in the central line direction; an inclined portion 702, which is inclined with respect to the central line direction from the lowermost end portion of the hollow circular columnar portion 701; and a supporting portion 703, which extends from the outermost radial portion of the hollow circular columnar portion 702 to the outside in a direction perpendicular to the central line direction so as to support the lower end portion of the coil spring 30.

The inner diameter of the hollow circular columnar portion 701 and the outer diameter of the fitting portion 11a of the outer cylinder 11 have such a dimensional relationship that the hollow circular columnar portion 701 and the fitting portion 11a are tightly fitted to each other. That is, the reinforcing member 70 is fixed to the outer cylinder 11 by press-fitting the hollow circular columnar portion 701 to the fitting portion 11a.

The inclined portion 702 is inclined so that its diameter increases gradually toward one of the end portions in the central line direction. By contacting the inclined portion 702 with the position determination portion 11b of the outer cylinder 11, movement of the reinforcing member 70 toward the lower direction is prevented. In other words, at the time when the reinforcing member 70 is being press-fitted to the outer cylinder 11, the press-fitting continues until the inclined portion 702 meets the position determination portion 11b, and this determines the position of the reinforcing member 70 in vertical relation to the position of the outer cylinder 11.

The reinforcing member 703 is basically a disk-shaped portion, and the outer diameter Do is greater than the central diameter Dc of the coil spring 30 (Do>Dc). At the supporting portion 703, a plurality of depression portions 704 (six in the embodiments) are formed at equal intervals in the circumferential direction.

The lower spring seat body 320 includes a mounting portion 321, an outer prevention portion 322, an inner prevention portion 323, a protrusion portion (not illustrated), a hollow circular columnar portion 325, an inclined portion 326, an orthogonal portion 327, and an enlarged diameter portion 328. These portions respectively have the same functions of the mounting portion 311, the outer prevention portion 312, the inner prevention portion 313, the protrusion portion 314, the hollow circular columnar portion 315, the inclined portion 316, the orthogonal portion 317, and the enlarged diameter portion 318, which are included in the lower spring seat 31 according to the first embodiment. However, the shapes of the mounting portion 321, the hollow circular columnar portion 325 and the inclined portion 326 on the outer cylinder 11 side are formed so as to fit the outer shape of the reinforcing member 70. Thus, the same number of protrusion portions 329 as the number of the depression portions 704 are provided on the lower end surface of the mounting portion 321 to be fitted to depression portions 704 of the supporting portion 703 of the reinforcing member 70. That is, between the lower spring seat body 320 and the reinforcing member 70, the protrusion portions 329 and the depression portions 704 are provided so as to prevent the rotation of the lower spring seat body 320 in the circumferential direction of the cylinder 10 with respect to the reinforcing member 70.

That is, the lower spring seat 32 according to the second embodiment includes: the mounting portion 321, on which the end portion on the wheel 110 side of the coil spring 30 rests; and the enlarged diameter portion 328, which is disposed on a side of the mounting portion 321 opposite to the cylinder 10 and disposed between the coil spring 30 and the wheel 110. The lower spring seat 32 further includes the lower spring seat body 320, in which the mounting portion 321 and the enlarged diameter portion 328 are each made of a resin material. The lower spring seat 32 further at least includes the metal reinforcing member 70 on the wheel 110 side of the mounting portion 321 to receive load of the coil spring 30. The lower spring seat 32 is fixed by press-fitting the reinforcing member 70 to the cylinder 10. Since rotation of the lower spring seat body 320 is prevented with respect to the reinforcing member 70 in the circumferential direction of the cylinder 10, the lower spring seat 32 rotates together with the cylinder 10.

In the lower spring seat 32 according to the second embodiment as described above, the hollow circular columnar portion 701 of the reinforcing member 70 is press-fitted into the fitting portion 11a of the outer cylinder 11 so that the reinforcing member 70 is fixed to the outer cylinder 11, and the lower spring seat body 320 is fitted to the outside of the reinforcing member 70. Here, the protrusion portion 329 of the lower spring seat body 320 is positioned so as to fit the position of the depression portion 704 of the reinforcing member 70.

In such a configuration of the second embodiment, the outer diameter Do of the supporting portion 703 of the metal reinforcing member 70 is larger than the central diameter Dc of the coil spring 30, and thus even if the load from the coil spring 30 is so large that the lower spring seat body 320, which is made of resin, is broken, the lower end portion of the coil spring 30 is supported, and coming off the coil spring 30 is prevented. Additionally, the protrusion portion 329 of the lower spring seat body 320 is fitted to the depression portion 704 of the reinforcing member 70, and thus the positions of the lower spring seat body 320 and the reinforcing member 70 are determined. This configuration prevents rotation of the lower spring seat body 320 upon receipt of rotational force in the circumferential direction from the coil spring 30. Since the plurality of depression portions 704 are disposed at the supporting portion 703 of the reinforcing member 70, which receives compression load from the coil spring 30, the reinforcing member 70 is higher in rigidity against breakage.

Since the lower spring seat body 320 is made of resin, the weight of the suspension 1 is reduced compared with integrally forming the reinforcing member 70 and the lower spring seat body 320 of metal. This configuration prevents sand, for example, from entering the space between the coil spring 30 and the lower spring seat 32, similarly to the lower spring seat 31 according to the first embodiment. If the lower spring seat 32 is made of metal, it is necessary to provide an elastic member to prevent sound caused by direct contact with the coil spring 30. The resin lower spring seat 32 eliminates the need for an elastic member, also similarly to the lower spring seat 31 according to the first embodiment.

Since the enlarged diameter portion 328 of the lower spring seat 32 is disposed between the coil spring 30 and the tire 112, even if the coil spring 30 is broken, bursting of the tire 112 caused by fragments of the coil spring 30 is prevented, also similarly to the lower spring seat 31 according to the first embodiment.

Insofar as rotation of the lower spring seat body 320 is prevented in the circumferential direction of the cylinder 10 with respect to the reinforcing member 70, any other configuration is possible than the configuration including the depression portion 704 of the reinforcing member 70 as described with reference to FIG. 4(b) and the protrusion portion 329 of the lower spring seat 320. A modification of the reinforcing member 70 will be described in detail later. Insofar as the lower spring seat body 320 prevents rotation in the circumferential direction of the cylinder 10 with respect to the reinforcing member 70, it is not necessary to provide a rotation prevention means such as the depression portion 704 and the protrusion portion 329.

[Modifications of the Reinforcing Member]

Figure 5:
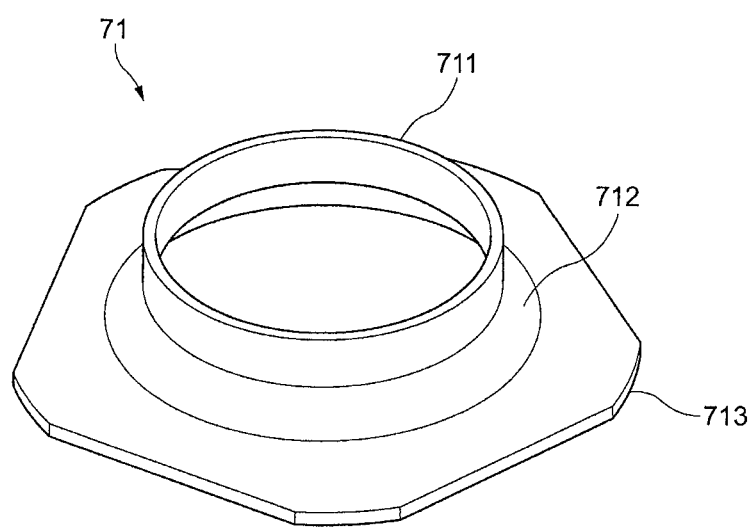
FIG. 5 is a view of a reinforcing member according to a first modification illustrating a schematic configuration of the reinforcing member.

FIG. 5 is a view of a reinforcing member illustrating a schematic configuration of the reinforcing member 71 according to a first modification.

The reinforcing member 71 according to the first modification includes a hollow circular columnar portion 711, an inclined portion 712, and a supporting portion 713, which respectively have the same functions as the functions of the hollow circular columnar portion 701, the inclined portion 702, and the supporting portion 703, which are included in the reinforcing member 70. The supporting portion 713 of the reinforcing member 71 according to the first modification is different from the reinforcing member 70 in that the shape of the outer peripheral portion is a polygon. Although not illustrated in FIG. 5, the depression portion 704 described above may be formed at the supporting portion 713.

At the lower end surface of the mounting portion 321 of the lower spring seat body 320 to be fitted to the outside of the reinforcing member 71 according to the first modification, a depression portion (not illustrated) is provided along the shape of the outer peripheral portion of the supporting portion 713 of the reinforcing member 71 according to the first modification.

Thus, the supporting portion 713 of the reinforcing member 71 according to the first modification is fitted to the inside (depression portion) of the lower end surface of the mounting portion 321 of the lower spring seat 32, and thus the positions of the supporting portion 713 and the mounting portion 321 are determined. This configuration prevents rotation of the lower spring seat body 320 upon receipt of rotational force in the circumferential direction from the coil spring 30 with respect to the reinforcing member 71. Since the shape of the outer periphery of the supporting portion 713 of the reinforcing member 71 according to the first modification is a polygon, as compared with the case where the outer peripheral portion is arc-shaped, the weight of the lower spring seat 32 is reduced.

Figure 6:
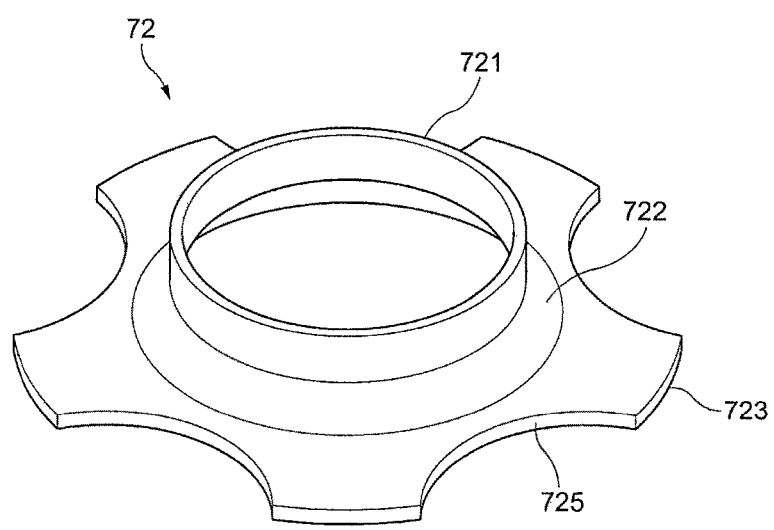
FIG. 6 is a view of a reinforcing member according to a second modification illustrating a schematic configuration of the reinforcing member.

FIG. 6 is a view of a reinforcing member illustrating a schematic configuration of the reinforcing member 72 according to a second modification.

The reinforcing member 72 according to the second modification includes a hollow circular columnar portion 721, an inclined portion 722, and a supporting portion 723, which respectively have the same functions as the functions of the hollow circular columnar portion 701, the inclined portion 702, and the supporting portion 703, which are included in the reinforcing member 70. The shape of the supporting portion 723 of the reinforcing member 72 according to the second modification is different from the reinforcing member 70 in that five cutout portions 725 cut out from the outer peripheral portion to the inner diameter side (the central line side) are formed at equal intervals in the circumferential direction. Although not illustrated in FIG. 6, depression portions 704 may be formed at the supporting portions 723.

On the lower end surface of the mounting portion 321 of the lower spring seat 32, which is fitted to the outside of the reinforcing member 72 according to the second modification, depression portions (not illustrated) are provided along the outer shape of the supporting portion 723 of the reinforcing member 72 according to the second modification.

Thus, the supporting portion 723 of the reinforcing member 72 according to the second modification is fitted to the inside (depression portion) of the lower end surface of the mounting portion 321 of the lower spring seat 32, and thus the positions of the supporting portion 723 and the mounting portion 321 are determined. This configuration prevents rotation of the lower spring seat body 320 upon receipt of rotational force in the circumferential direction from the coil spring 30 with respect to the reinforcing member 71. Since the cutout portions 725 are formed at the outer peripheral portion of the supporting portion 723 of the reinforcing member 72 according to the second modification, as compared with the case where the outer peripheral portion is arc-shaped, the weight of the lower spring seat 32 is reduced.

Although FIG. 6 illustrates the reinforcing member 72 with five cutout portions 725 formed at the outer peripheral portion of the supporting portion 723, the number of the cutout portions 725 is not limited to five. The shape and the size of the cutout portions 725 are not limited to the size and shape illustrated in FIG. 6.

[Modifications of the Lower Spring Seat]

Figure 7:
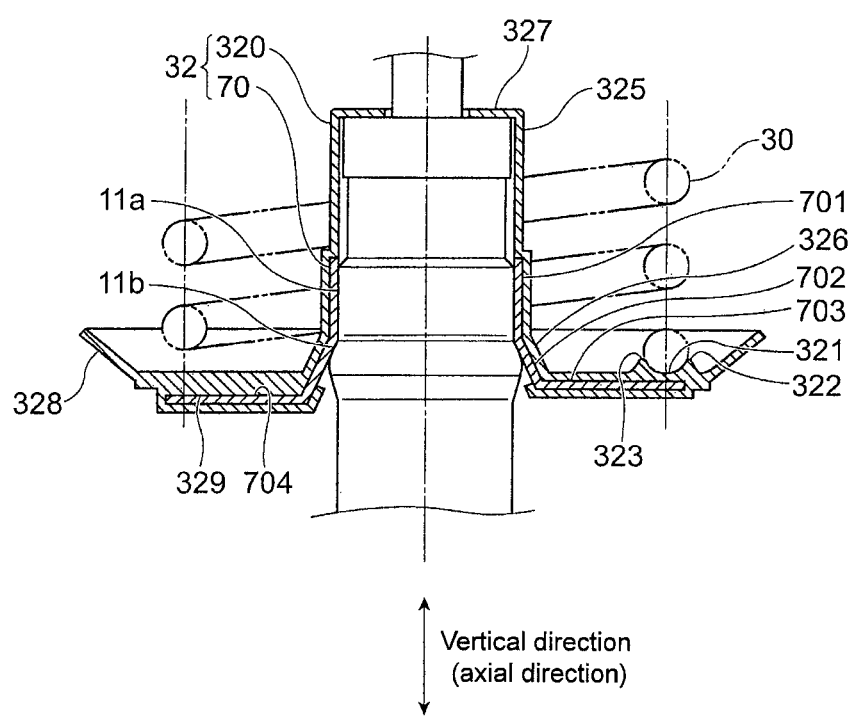
FIG. 7 is a view of a modification of a lower spring seat according to the second embodiment.

FIG. 7 is a view of a modification of the lower spring seat 32 including the lower spring seat body 320 and any one of the reinforcing members 70 to 72.

In the above configuration, although the lower spring seat body 320 and each of the reinforcing members 70 to 72 are regarded as individual bodies, the lower spring seat body 320 and each of the reinforcing members 70 to 72 may be integrally molded. That is, with one of the reinforcement members 70 to 72 set in a mold, a resin as the material of the lower spring seat body 320 is allowed to fill the mold, thus performing insert molding of one of the reinforcement members 70 to 72. FIG. 7 is a cross-sectional view of the lower spring seat 32 formed by integrally molding the lower spring seat body 320 and the reinforcing member 70.

This configuration provides similar advantageous effects to the advantageous effects described above.

Third Embodiment

Next, a lower spring seat 33 according to a third embodiment will be described.

Figure 8A:
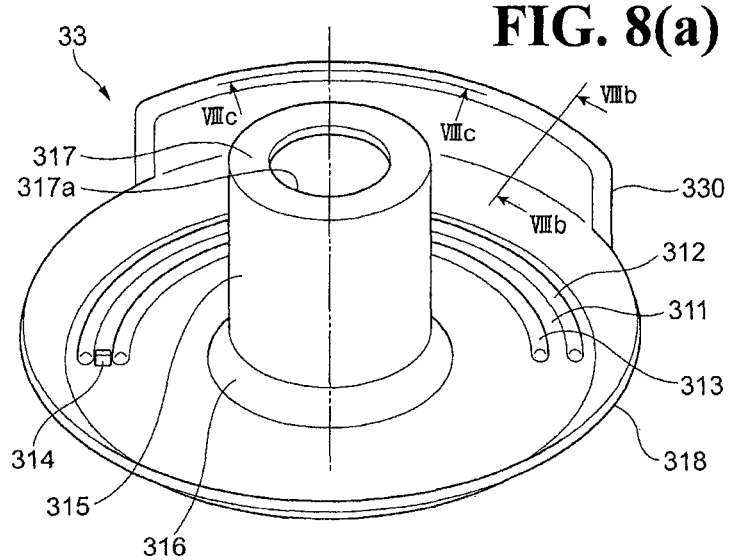
FIG. 8(a) is a perspective view of a lower spring seat according to a third embodiment.
Figure 8B:
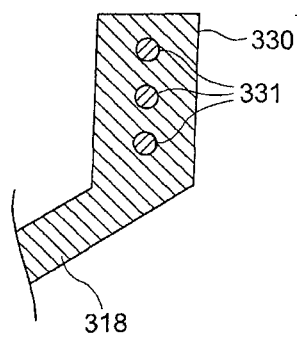
FIG. 8(b) is a cross-sectional view taken along the line VIIIb-VIIIb in FIG. 8(a)
Figure 8C:
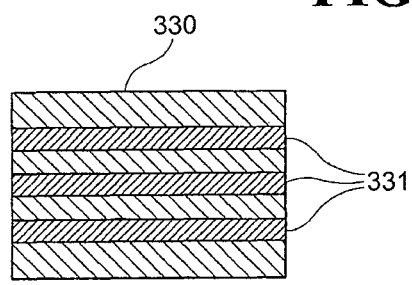
FIG. 8(c) is a cross-sectional view taken along the line VIIIc-VIIIc in FIG. 8(a).

FIG. 8(a) is a perspective view of the lower spring seat 33 according to the third embodiment. FIG. 8(b) is a cross-sectional view taken along the line VIIIb-VIIIb in FIG. 8(a). FIG. 8(c) is a cross-sectional view taken along the line VIIIc-VIIIc in FIG. 8(a).

The lower spring seat 33 according to the third embodiment is different from the lower spring seat 31 according to the first embodiment in that at an outer peripheral portion of an enlarged diameter portion 318, a reinforcing portion 330 is included to reinforce the enlarged diameter portion 318.

The following description will focus on respects different from the first embodiment, omitting those respects already described hereinbefore.

At the enlarged diameter portion 318, the lower spring seat 33 according to the third embodiment includes the reinforcing portion 330, which extends upwardly from the outer peripheral portion. The enlarged diameter portion 318 includes a strengthening member 331, which is casted in the enlarged diameter portion 318 and made of a material that is higher in strength than the resin used as the base material of the lower spring seat 33. That is, in the enlarged diameter portion 318, the strengthening member 331 is insert-molded. In this embodiment, the enlarged diameter portion 318 and the reinforcing portion 330, which is a part of the enlarged diameter portion 318, correspond to the "intermediate portion" according to the present invention. FIG. 8(b) and FIG. 8(c) illustrate an embodiment in which the strengthening members 331 are casted in the reinforcing portion 330 of the enlarged diameter portion 318. Examples of the material of the strengthening member 331 include metal, graphite, and a resin having a higher strength than the base resin material of the lower spring seat 33. The strengthening members 331 illustrated in FIG. 8(b) and FIG. 8(c) are metal wires, and the plurality of (three in FIG. 8) strengthening members 331, which extend in the circumferential direction, are vertically aligned at equal intervals. In the molding of the lower spring seat 33 according to the third embodiment, with the strengthening members 331 set in the mold, a base resin is allowed to fill the mold; thus the lower spring seat 33 is molded.

That is, the lower spring seat 33 according to the third embodiment includes: the mounting portion 311, on which the lower end portion of the coil spring 30 rests; and the enlarged diameter portion 318, which is disposed on a side of the mounting portion 311 opposite to the cylinder 10 and disposed between the coil spring 30 and the wheel 110, in which the mounting portion 311 and the enlarged diameter portion 318 are each made of a resin material. The enlarged diameter portion 318 includes the strengthening members 331, which are made of a material higher in strength than the materials of the mounting portion 311 and the enlarged diameter portion 318. The lower spring seat 33 is fixed by being press-fitted into the cylinder 10.

The lower spring seat 33 according to the third embodiment configured as described above includes the enlarged diameter portion 318 with the strengthening members 331 of a high-strength material. This configuration ensures that even if the coil spring 30 is broken and if fragments of the broken coil spring 30 are directed with force toward the tire 112, breakage of the lower spring seat 33 itself is prevented more reliably. Thus, the use of the lower spring seat 33 according to the third embodiment more reliably prevents bursting of the tire 112 by the fragments of the coil spring 30 stuck in the tire 112.

Since the lower spring seat 33 is made of resin, the weight of the suspension 1 is reduced compared with forming the lower spring seat 33 using a metal, and the suspension 1 is formed more easily, similar to the lower spring seat 31 according to the first embodiment. This configuration prevents sand, for example, from entering the space between the coil spring 30 and the lower spring seat 33, similarly to the lower spring seat 31 according to the first embodiment.

[Modifications of the Strengthening Member]

FIGS. 9(a) to 9(d) are views of modifications of the strengthening member 331, and cross-sectional views taken along the line VIIIb-VIIIb in FIG. 8(a).

FIGS. 10(a) to 10(d) are views of modifications of the strengthening member 331, and cross-sectional views taken along the line VIIIc-VIIIc in FIG. 8(a).

Figure 9A:
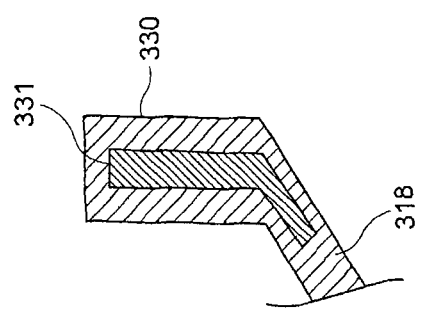
FIGS. 9(a), 9(b), 9(c) and 9(d) are views of modifications of a strengthening member, and cross-sectional views taken along the line VIIIb-VIIIb in FIG. 8(a).
Figure 9B:
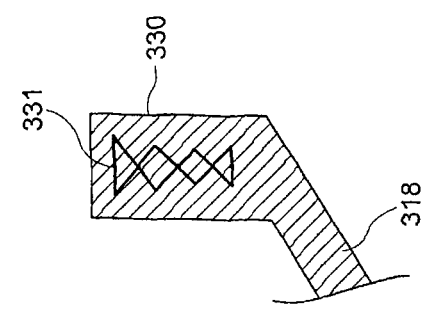
Figure 9C:
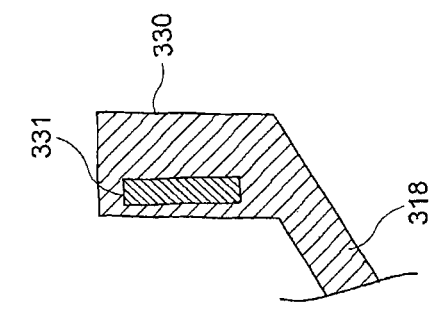
Figure 9D:
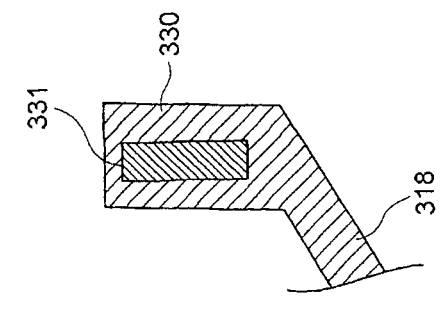

The shape, the position, and the number of the strengthening member 331 are not particularly limited. As illustrated in FIG. 9(a), FIG. 9(b), and FIG. 10(a), the strengthening member 331 may have a rectangular parallelepiped shape. As illustrated in FIG. 9(c), FIG. 10(b), and FIG. 10(c), the strengthening member 331 may be woven into a mesh (net) or lattice. Additionally, as illustrated in FIG. 10(d), not only the strengthening members 331, which are wires, may be disposed in the circumferential direction, but also the plurality of strengthening members 331 arranged to extend in the vertical direction may be aligned at equal intervals in the circumferential direction. The position at which the strengthening member 331 is arranged is not limited to the center of the reinforcing portion 330 as illustrated in FIG. 9(a), and may be a site at the central line side of the reinforcing portion 330 (inner side) as illustrated in FIG. 9(b), or the outer site in the reinforcing portion 330. Furthermore, as illustrated in FIG. 9(d), the position at which the strengthening member 331 is arranged is not limited to the inside of the reinforcing portion 330 only, but may be at the entire enlarged diameter portion 318.

[Modifications of the Portion at which the Strengthening Member is Arranged]

Figure 11A:
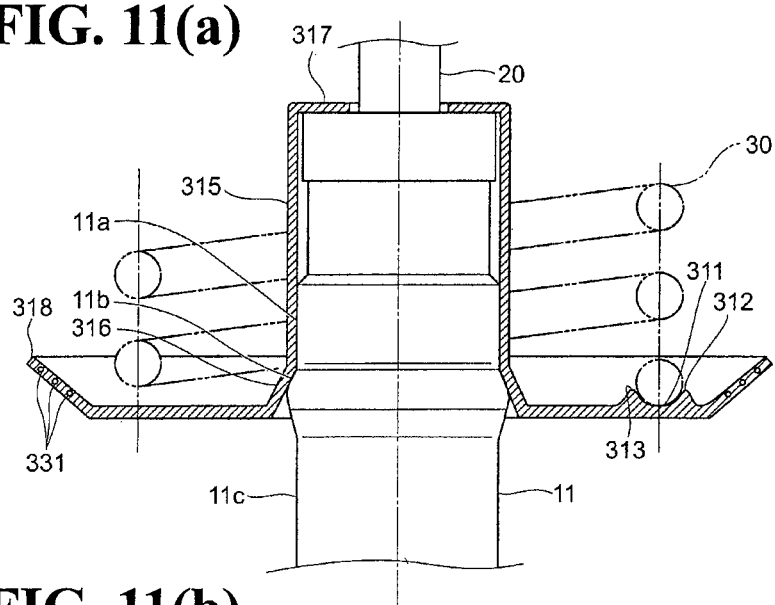
FIGS. 11(a) and 11(b) are views of modifications of a lower spring seat body of the lower spring seat according to the second embodiment.
Figure 11B:
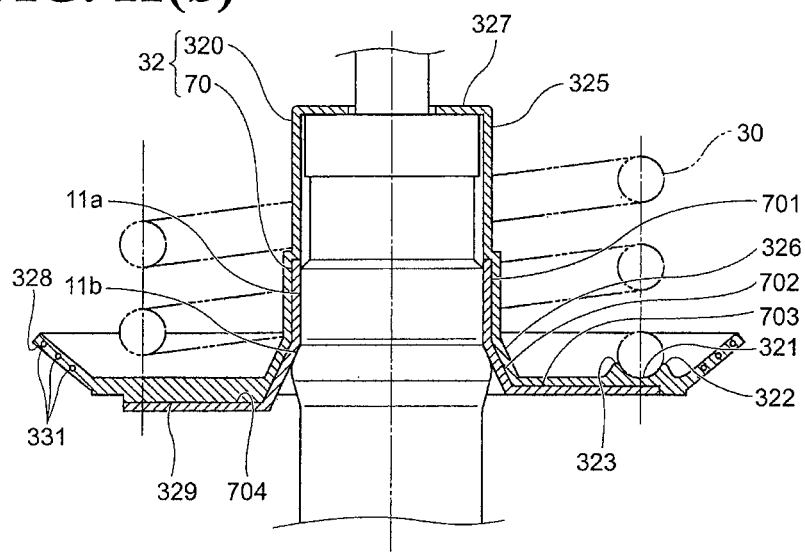

FIG. 11(a) is a view of a modification of the lower spring seat 31 according to the first embodiment. FIG. 11(b) is a view of a modification of the lower spring seat body 320 of the lower spring seat 32 according to the second embodiment.

As illustrated in FIG. 11(a), in the enlarged diameter portion 318 of lower spring seat 31 according to the first embodiment, the strengthening member 331 as described above may be casted. In other words, the enlarged diameter portion 318 of the lower spring seat 31 according to the first embodiment may include the strengthening member 331 as described above. The shape, the size, and the number of the strengthening members 331 in the enlarged diameter portion 318 are not particularly limited, examples including the modifications as illustrated in FIG. 9 and FIG. 10.

Similarly, as illustrated in FIG. 11(b), in the enlarged diameter portion 328 of the lower spring seat body 320 according to the second embodiment, the strengthening member 331 as described above may be cased. In other words, the enlarged diameter portion 328 of the lower spring seat body 320 according to the second embodiment may include the strengthening members 331. The shape, the size, and the number of the strengthening members 331 in the enlarged diameter portion 328 are not particularly limited, applicable examples including the modifications as illustrated in FIG. 9 and FIG. 10.

With this configuration, even if the coil spring 30 is broken, the enlarged diameter portion 318 or the enlarged diameter portion 328 having the strengthening members 331 more reliably keeps fragments of the coil spring 30 away from the tire 112. As a result, bursting of the tire 112 by the fragments of the coil spring 30 stuck in the tire 112 is prevented more reliably.

Figure 12A:
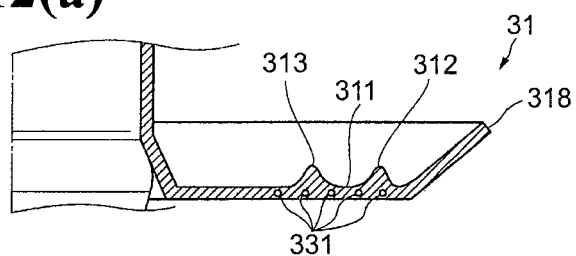
FIGS. 12(a) and 12(b) are views of modifications of the lower spring seat according to the first embodiment.
Figure 12B:
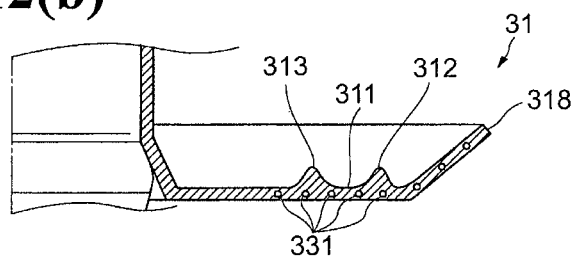
Figure 12C:
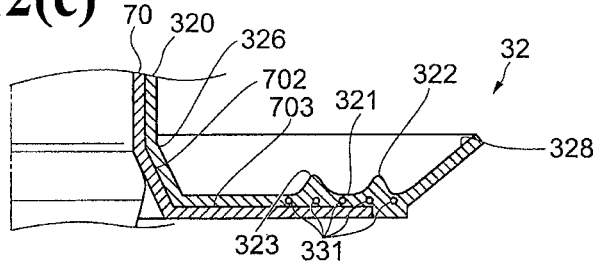
FIGS. 12(c) and 12(d) are views of modifications of the lower spring seat body of the lower spring seat according to the second embodiment.
Figure 12D:
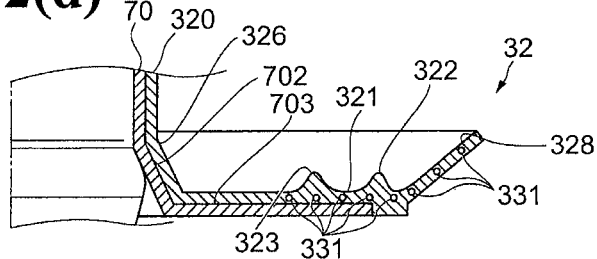

FIG. 12(a) and FIG. 12(b) are views of modifications of the lower spring seat 31 according to the first embodiment. FIG. 12(c) and FIG. 12(d) are views of modifications of the lower spring seat body 320 of the lower spring seat 32 according to the second embodiment.

As illustrated in FIG. 12(a), the mounting portion 311 of the lower spring seat 31 according to the first embodiment may include the strengthening members 331 as described above. As illustrated in FIG. 12(b), the mounting portion 311 and the enlarged diameter portion 318 of the lower spring seat 31 according to the first embodiment may include the strengthening members 331 as described above. As illustrated in FIG. 12(c), the mounting portion 321 of the lower spring seat body 320 according to the second embodiment may include the strengthening members 331. As illustrated in FIG. 12(d), the mounting portion 321 and the enlarged diameter portion 328 of the lower spring seat body 320 according to the second embodiment may include the strengthening members 331. The shape, the size, and the number of the strengthening members 331 included in the mounting portion 311 or the mounting portion 321 are not particularly limited, applicable examples including the modifications as illustrated in FIG. 9 and FIG. 10.

By incorporating the strengthening members 331 in the mounting portion 311 or 321, even if the load from the coil spring 30 is large, the breakage of the lower spring seat 31 according to the first embodiment and the lower spring seat body 320 according to the second embodiment is prevented. By incorporating the strengthening members 331 in the enlarged diameter portion 318 or 328, even if the coil spring 30 is broken, fragments of the coil spring 30 are more reliably kept away from the tire 112. As a result, bursting of the tire 112 by the fragments of the coil spring 30 stuck in the tire 112 is prevented more reliably.

[Modifications of the Reinforcing Portion]

The reinforcing portion 330 of the lower spring seat 33 according to the third embodiment described above is integrally molded so as to be continuous with the enlarged diameter portion 318, but is not particularly limited to this embodiment; the reinforcing portion 330 may be a separate portion from the other portions of the lower spring seat 33 such as the enlarged diameter portion 318. In a later step, article formed separately from the lower spring seat 33 may be adhered or fitted to the enlarged diameter portion 318 of the lower spring seat 33. The enlarged diameter portion 318 may also be formed as a separate portion from the mounting portion 311, the inclined portion 316, the hollow circular columnar portion 315, the orthogonal portion 317, and other portions, and in a later step, the enlarged diameter portion 318 may be bonded to the mounting portion 311.

Fourth Embodiment

A lower spring seat 34 according to a fourth embodiment will be described.

Figure 13A:
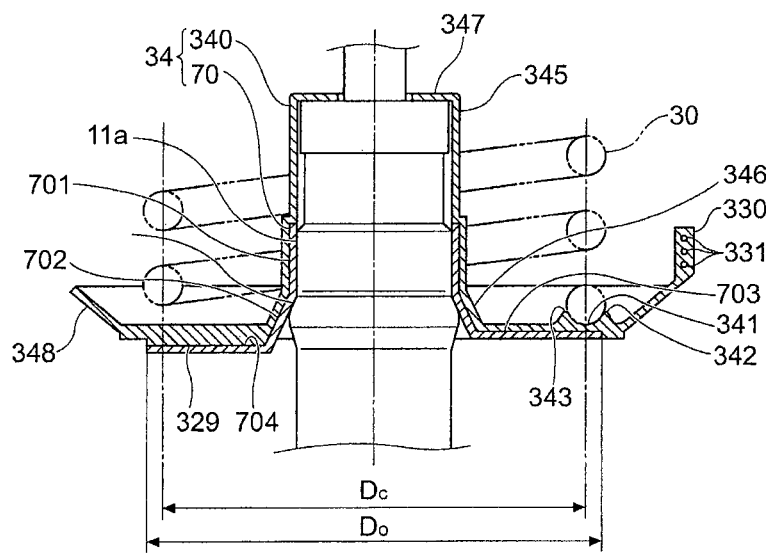
FIG. 13(a) is a cross-sectional view of a lower spring seat according to a fourth embodiment.

FIG. 13(a) is a cross-sectional view of the lower spring seat 34 according to the fourth embodiment.

The lower spring seat 34 according to the fourth embodiment is different from the configuration of the first embodiment in that the lower spring seat 34 according to the fourth embodiment includes: a lower spring seat body 340, which is made of resin; and the reinforcing member 70 according to the second embodiment interposed between the lower spring seat body 340 and the outer cylinder 11 of the cylinder 10, and in that the reinforcing portion 330 according to the third embodiment is provided in the lower spring seat body 340. In other words, the lower spring seat 34 according to the fourth embodiment is different from the lower spring seat 32 according to the second embodiment in that the lower spring seat body 340 according to the fourth embodiment includes the reinforcing portion 330 according to the third embodiment.

More specifically, the lower spring seat body 340 includes a mounting portion 341, an outer prevention portion 342, an inner prevention portion 343, a protrusion portion (not illustrated), a hollow circular columnar portion 345, an inclined portion 346, an orthogonal portion 347, an enlarged diameter portion 348, and a protrusion portion 349. These portions respectively have same functions as the functions of the mounting portion 321, the outer prevention portion 322, the inner prevention portion 323, the protrusion portion 324, the hollow circular columnar portion 325, the inclined portion 326, the orthogonal portion 327, the enlarged diameter portion 328, and the protrusion portion 329 included in the lower spring seat 32 according to the second embodiment. The lower spring seat body 340 includes the reinforcing portion 330, which extends upwardly from the outer peripheral portion of the enlarged diameter portion 348. In at least one of the reinforcing portion 330 and the enlarged diameter portion 348, the strengthening members 331 made of a material higher in strength than the resin used as the base material of the lower spring seat body 340 is casted.

In the lower spring seat 34 according to the fourth embodiment configured as described above, the outer diameter Do of the supporting portion 703 of the metal reinforcing member 70 is larger than the central diameter Dc of the coil spring 30. This configuration ensures that even if the load from the coil spring 30 is so large that the lower spring seat body 340, which is made of resin, is broken, the lower end portion of the coil spring 30 is supported, and coming off the coil spring 30 is prevented. Even if the coil spring 30 is broken and if fragments of the broken coil spring 30 are directed with force toward the tire 112, the enlarged diameter portion 348 includes the strengthening members 331, which are made of a material higher in strength, and thus breakage of the lower spring seat body 340 itself is prevented more reliably. Thus, the use of the lower spring seat 34 according to the fourth embodiment more reliably prevents bursting of the tire 112 by the fragments of the coil spring 30 stuck in the tire 112.

Since the lower spring seat body 340 is made of resin, the weights of the lower spring seat 34 and the suspension 1 are reduced, and the lower spring seat 34 and the suspension 1 are formed more easily, similarly to the lower spring seat 31 according to the first embodiment, compared with forming not only the reinforcing member 70 but also the lower spring seat body 340 of metal. This configuration prevents sand, for example, from entering the space between the coil spring 30 and the lower spring seat 34, similarly to the lower spring seat 31 according to the first embodiment.

Figure 13B:
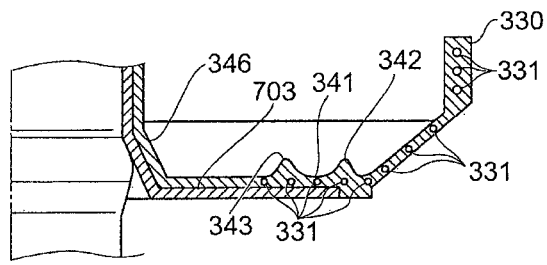
FIG. 13(b) is a cross-sectional view of a lower spring seat body including strengthening members at an entire enlarged diameter portion and at the mounting portion.
Figure 14A:
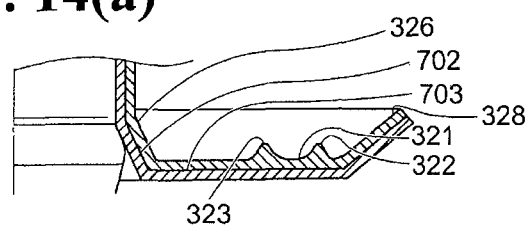
FIGS. 14(a), 14(b), 14(c) and 14(d) are views of various combinations of modifications of the reinforcing member and the lower spring seat body according to the second embodiment.
Figure 14B:
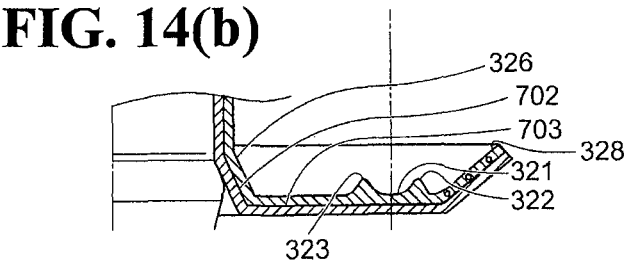
Figure 14C:
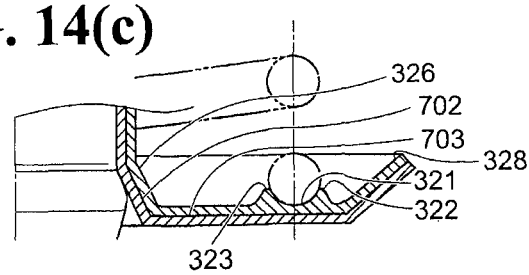
Figure 14D:
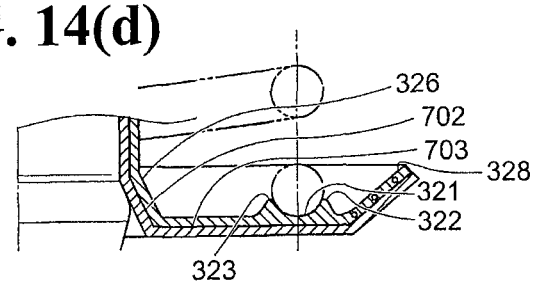

The mounting portion 341 of the lower spring seat body 340 may include the strengthening member 331 as described above. FIG. 13(*b*) is a cross-sectional view of the lower spring seat body 340, which includes strengthening members 331 at the entire enlarged diameter portion 348 and at the mounting portion 341. The shape, the size, and the number of the strengthening members 331 that the mounting portion 341 includes are not particularly limited, applicable examples including the modifications illustrated in FIG. 9 and FIG. 10.

With this configuration, even if the load from the coil spring 30 is large, the breakage of the lower spring seat 34 according to the fourth embodiment is prevented.

[Various Combinations of the Modifications of the Reinforcing Member and the Modifications of the Lower Spring Seat Body]

FIG. 14 are views of various combinations of the modifications of the reinforcing member 70 and the lower spring seat body 320 according to the second embodiment. FIG. 14(*a*) is a view of a combination of a modification of the reinforcing member 70 and the lower spring seat body 320 according to the second embodiment. FIG. 14(*b*) is a view of a combination of a modification of the reinforcing member 70 and the lower spring seat body 320 in which the enlarged diameter portion 328 includes the strengthening members 331. FIG. 14(*c*) is a view of a combination of a modification of the reinforcing member 70 and the lower spring seat body 320 in which the mounting portion 321 includes the strengthening members 331. FIG. 14(*d*) is a view of a combination of a modification of the reinforcing member 70 and the lower spring seat body 320 in which both the enlarged diameter portion 328 and the mounting portion 321 include the strengthening members 331.

The reinforcing member 70 included in the lower spring seat 32 according to the second embodiment described above may include a reinforcing enlarged diameter portion 705 on the peripheral side of the supporting portion 703, which supports the lower end portion of the coil spring 30. The reinforcing enlarged diameter portion 705 has a diameter that gradually increases from the outer peripheral end portion of the supporting portion 703 toward the upward direction. The reinforcing enlarged diameter portion 705 is, as illustrated in FIG. 14(*a*) to FIG. 14(*d*), preferably formed so as to support the lower end portion of the enlarged diameter portion 328 of the lower spring seat body 320 according to the second embodiment.

Figure 15A:
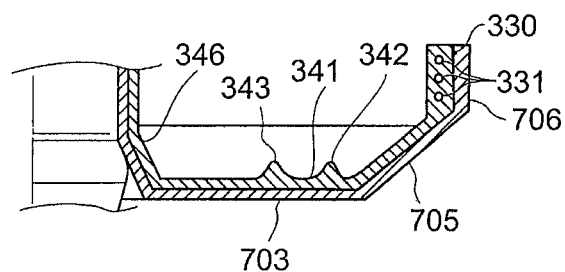
FIGS. 15(a) and 15(b) are views of various combinations of modifications of the reinforcing member and the lower spring seat body according to a fourth embodiment.
Figure 15B:
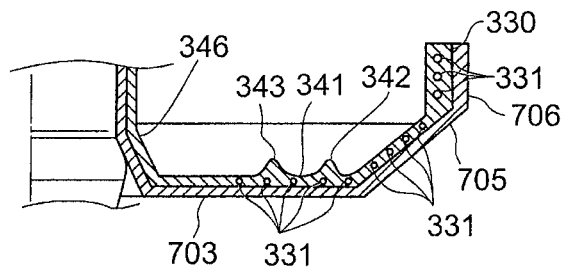
Figure 16:
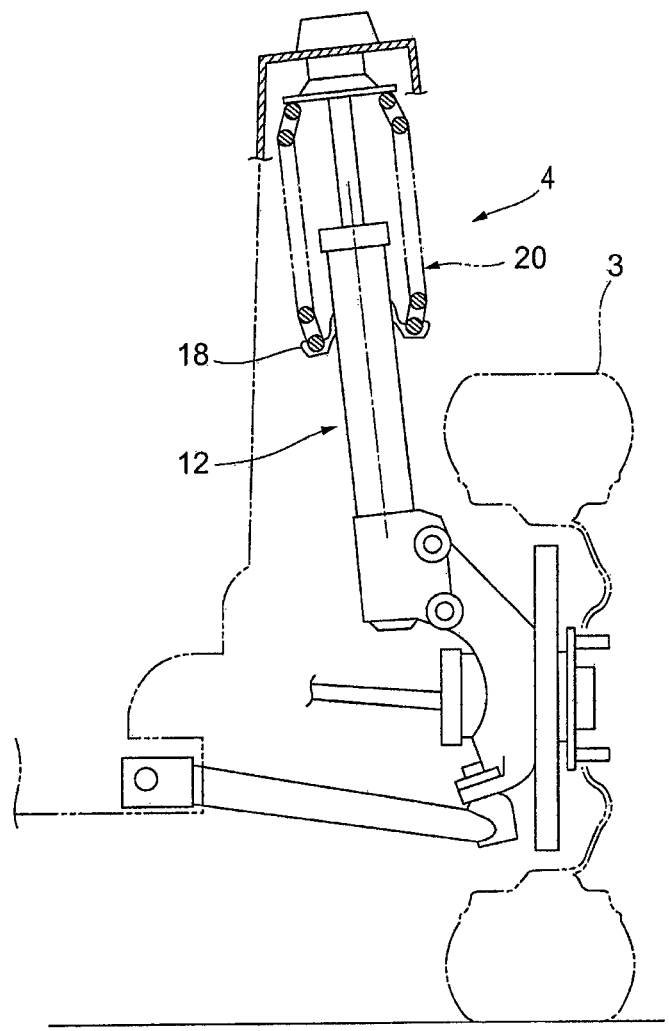
FIG. 16 is a view of a suspension disclosed in patent document 1 illustrating a schematic configuration of the suspension.

FIG. 15 are views of various combinations of the modifications of the reinforcing member 70 and the lower spring seat body 340 according to the fourth embodiment. FIG. 15(*a*) is a view of a combination of a modification of the reinforcing member 70 and the lower spring seat body 340 according to the fourth embodiment. FIG. 15(*b*) is a view of a combination of a modification of the reinforcing member 70 and the lower spring seat body 340 in which the mounting portion 341 also includes the strengthening member 331. FIG. 15(*b*) illustrates a cross-sectional view of the lower spring seat body 340 in which both the entire enlarged diameter portion 348 and the mounting portion 341 include the strengthening member 331.

The reinforcing member 70 included in the lower spring seat 34 according to the fourth embodiment described above may include the reinforcing enlarged diameter portion 705 on the peripheral side of the supporting portion 703, which supports the lower end portion of the coil spring 30. The reinforcing enlarged diameter portion 705 has a diameter that gradually increases from the outer peripheral end portion of the supporting portion 703 toward the upward direction. The reinforcing member 70 may further include an upper portion 706, which extends upwardly from the upper end portion of the reinforcing enlarged diameter portion 705.

As illustrated in FIG. 15(*a*) and FIG. 15(*b*), it is preferable that the reinforcing enlarged diameter portion 705 supports the lower end portion of the reinforcing portion of the enlarged diameter portion 348 of the lower spring seat body 340 according to the fourth embodiment, and that the upper portion 706 is shaped so as to support the outer surface of the reinforcing portion 330.

With this configuration, even if the coil spring 30 is broken, the reinforcing enlarged diameter portion 705 or the upper portion 706 disposed at the metal reinforcing member 70 more reliably keeps fragments of the coil spring 30 away from the tire 112. As a result, bursting of the tire 112 caused by the fragments of the coil spring 30 stuck in the tire 112 is prevented more reliably.

Fifth Embodiment

A spring seat 55 according to a fifth embodiment will be described.

Figure 17:
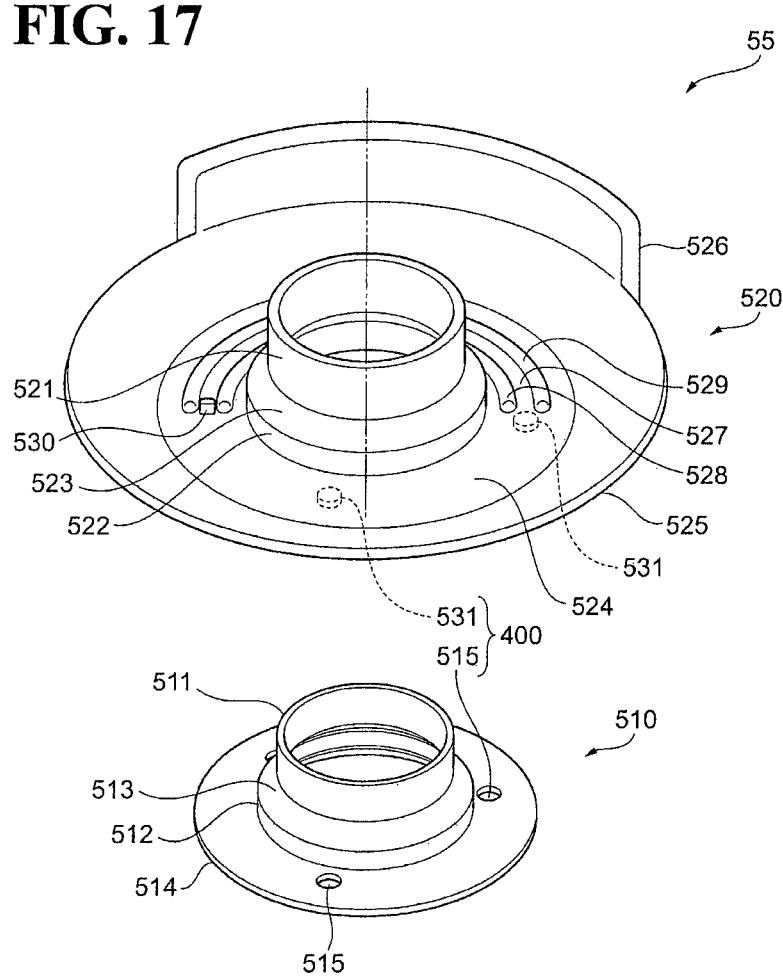
FIG. 17 is a perspective view of a metal seat and a resin seat.

FIG. 17 is a perspective view of a metal seat and a resin seat, described later.

Figure 18:
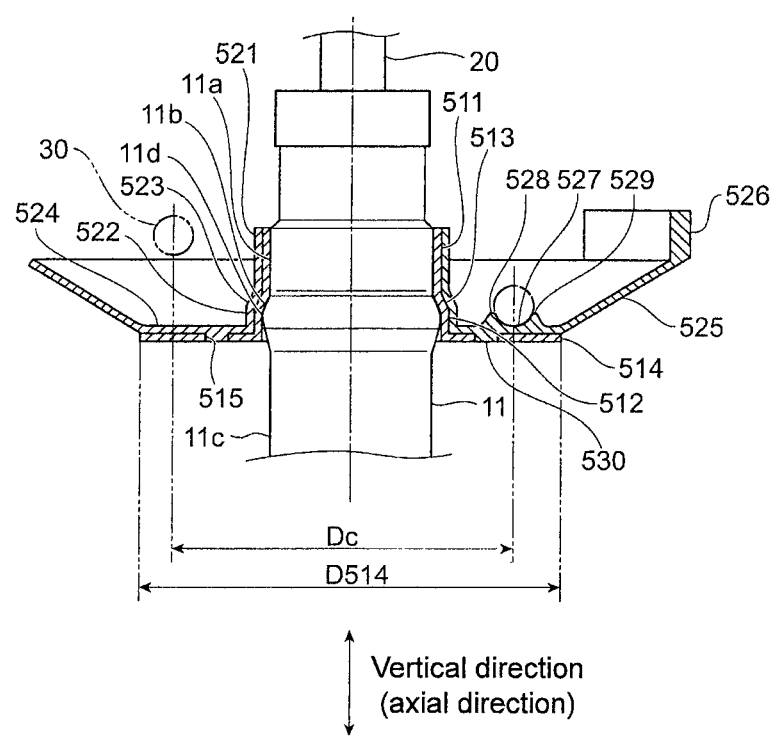
FIG. 18 is a cross-sectional view of a lower spring seat according to a fifth embodiment.

FIG. 18 is a cross-sectional view of a lower spring seat 55 according to the fifth embodiment.

The lower spring seat 55 according to the fifth embodiment is a spring seat mounted on the cylinder 10, which contains the damper device, to support the wheel-side end portion of the coil spring 30, which is disposed between a vehicle body and the wheel. The lower spring seat 55 includes: a resin seat 520, which is an example of the resin member disposed between the spring coil 30 and the wheel; a metal seat 510, which is an example of the reinforcing member disposed on the side of the wheel of the resin seat 520 to receive the load from the coil spring 30; and a position deviation prevention mechanism 400, which prevents position deviation between at least two adjacent members among the resin seat 520, the metal seat 510, and the cylinder 10.

(Configuration of the Metal Seat)

The metal seat 510 includes: a first hollow circular columnar portion 511, which has a hollow circular columnar shape and which extends in the vertical direction; and a second hollow circular columnar portion 512, which has a hollow circular columnar shape and which extends in the vertical direction below the first hollow circular columnar portion 511 with the inner diameter greater than the inner diameter of the first hollow circular columnar portion 511. The metal seat 510 includes an inclined portion 513, which is inclined with respect to the vertical direction so as to connect the first hollow circular columnar portion 511 and the second hollow circular columnar portion 512. The metal seat 510 includes a load mounting portion 514, which extends from the lower end portion of the second hollow circular columnar portion 512 to the outside in a direction perpendicular to the vertical direction so as to receive the load of the coil spring 30.

As illustrated in FIG. 18, the outer cylinder 11 of the cylinder 10 includes: a cylinder portion 11c; the fitting portion 11a, which is fitted to the second hollow circular columnar portion 312 of the metal seat 510; and the position determination portion 11b, which protrudes radially outward with respect to the cylinder portion 11c to determine the position of the metal seat 510 in the vertical direction.

The fitting portion 11a is a portion with approximately the same shape as the cylinder portion 11c.

The position determination portion 11b includes a protrusion portion 11d, which protrudes radially outward with respect to the fitting portion 11a.

The outer cylinder 11 is formed by press-working a metal pipe. Here, an example is that the position determination portion 11b and other portions are formed by bulge forming. The cylinder portion 11c and the fitting portion 11a may be formed using one pipe, and the position determination portion 11b as a separate member may be fixed to the pipe by welding or some other method.

The inner diameter of the first hollow circular columnar portion 511 of the metal seat 510 and the outer diameter of the fitting portion 11a of the outer cylinder 11 have such a dimensional relationship that the first hollow circular columnar portion 511 and the fitting portion 11a are tightly fitted to each other. That is, the metal seat 510 is fixed to the outer cylinder 11 by press-fitting the first hollow circular columnar portion 511 to the fitting portion 11a of the outer cylinder 11.

The inner diameter of the second hollow circular columnar portion 512 is set to equal to or larger than the outer diameter of the position determination portion 11b of the outer cylinder 11.

The inclined portion 513 is inclined so that its diameter gradually increases toward the lower direction. By contacting the inclined portion 513 with the position determination portion 11b of the outer cylinder 11, downward movement of the metal seat 510 is prevented. In other words, at the time when the metal seat 510 is being press-fitted to the outer cylinder 11, the press-fitting continues until the inclined portion 513 meets the position determination portion 11b, and this determines the positions of the metal seat 510 and the outer cylinder 11 in the vertical direction.

The load mounting portion 514 is basically a disk-shaped portion. As illustrated in FIG. 18, the outer diameter D514 is larger than the central diameter Dc of the lower end portion of the coil spring 30 (D514>Dc). At the load receiving part 514, a plurality of (three in this embodiment) through holes 515 penetrate in the vertical direction at equal intervals in the circumferential direction.

(Configuration of the Resin Seat)

The resin seat 520 includes: a first hollow circular columnar portion 521, which has a hollow circular columnar shape and which extends in the vertical direction; and a second hollow circular columnar portion 522, which has a hollow circular columnar shape and which extends in the vertical direction below the first hollow circular columnar portion 521 with the inner diameter larger than the inner diameter of the first hollow circular columnar portion 521. The resin seat 520 includes an inclined portion 523, which is inclined with respect to the vertical direction so as to connect the first hollow circular columnar portion 521 and the second hollow circular columnar portion 522.

The resin seat 520 includes a pressure mounting portion 524, which extends from the lower end portion of the second hollow circular columnar portion 522 to the outside in a direction perpendicular to the vertical direction, and which is an example of the mounting portion supporting the lower end portion of the coil spring 30. The resin seat 320 includes: an outer portion 525, which is disposed at the outer portion with respect to the pressure mounting portion 524; and an extending portion 526, which extends upwardly from the upper portion of the outer portion 525.

The outer portion 525 is formed over the entire circumference, with the diameter gradually extending upwardly from the outermost diameter portion of the pressure mounting portion 524. The extending portion 526 illustrated in FIG. 17 extends over a quarter of the entire circumference upwardly from the upper portion of the outer portion 525. However, the extending portion 526 may, over the entire circumference, extend upwardly from the upper portion of the outer portion 525. The outer portion 525, the extending portion 526, and other portions serve the functions of the intermediate portion that is disposed on the side of the pressure mounting portion 524 opposite to the cylinder 10 and that is disposed between the coil spring 30 and the wheel.

The resin seat 520 includes a mounting surface 527 on a surface of the coil spring 30 side at the pressure mounting portion 524 so as to mount the lower end portion of the coil spring 30.

The resin seat 320 includes an inner prevention portion 528 and an outer prevention portion 529, which are disposed inside and outside in the radial direction of the mounting surface 527. The inner prevention portion 528 and the outer prevention portion 529 protrude upwardly from the pressure mounting portion 524 to prevent radially inward and outward movement of the lower end portion of the coil spring 30.

Since the number of end turns of the coil spring 30 according to this embodiment is ½, the lower end portion of the coil spring 30 is in contact with the mounting surface 527 over approximately 180 degrees. The inner prevention portion 528 and the outer prevention portion 529 prevent the lower end portion of the coil spring 30 from moving over approximately 180 degrees.

The resin seat 520 includes a rectangular parallelepiped upper protrusion portion 530, which protrudes upwardly from the pressure mounting portion 524 at a starting point of the inner prevention portion 528 and the outer prevention portion 529. By the contact of the tip of the lower end portion of the coil spring 30 with the upper protrusion portion 530, the rotation of the coil spring 30 in the circumferential direction is prevented. The angle at which the lower end portion of the coil spring 30 and the mounting surface 527 are brought into contact with each other may be other than 180 degrees.

The pressure mounting portion 524 of the resin seat 520 includes a solid circular columnar lower protrusion portion 531, which protrudes downwardly at the surface on the metal seat 510 side of the pressure mounting portion 524.

Examples of the material of the resin seat 520 include ABS, engineering plastics, polycarbonate, urethane, and nylon.

More specifically, the sizes of the first hollow circular columnar portion 521, the second hollow circular columnar portion 522, and the inclined portion 523 of the resin seat 520 are larger than the sizes of the first hollow circular columnar portion 511, the second hollow circular columnar portion 512, and the inclined portion 513 of the metal seat 510. The resin seat 520 and the metal seat 510 are loosely fitted to each other.

The metal seat 510 and the resin seat 520 are aligned vertically in an overlapping manner so that the surface of the metal seat 510 side (lower surface) of the pressure mounting portion 524 of the resin seat 520 and the surface of the resin seat 520 side (upper surface) of the load mounting portion 514 of the metal seat 510 are in contact with each other. Accordingly, downward movement of the resin seat 520 is prevented.

The position deviation prevention mechanism 400 includes: a protrusion portion disposed at one of the metal seat 510 and the pressure mounting portion 524 (resin seat 520) and protruding in the axial direction of the cylinder 10; and a depression portion disposed at the other one of the metal seat 510 and the pressure mounting portion 524 and depressed in the axial direction to be fitted with the protrusion portion.

In the lower spring seat 55 according to the fifth embodiment, the position deviation prevention mechanism 400 includes: a lower protrusion portion 531, which is an example of the protrusion portion and which is disposed at the resin seat 520 and protrudes in the axial direction of the cylinder 10; and a through hole 515, which is an example of the depression portion and which is disposed at the metal seat 510 and depressed in the axial direction to be fitted with the lower protrusion portion 531.

That is, in the lower spring seat 55 according to the fifth embodiment, the lower protrusion portion 531, which is disposed on the surface of the metal seat 510 side of the pressure mounting portion 524 of the resin seat 520, is fitted to the through hole 515, which is formed in the load mounting portion 514 of the metal seat 510. Accordingly, movement in the circumferential direction of the resin seat 520 with respect to the metal seat 510 is prevented.

The lower spring seat 55 is arranged in such a manner that the extending portion 526 is positioned above the tire 112 with the outer portion 525 disposed outside of the pressure mounting portion 524 and with the suspension 1 mounted on the vehicle as illustrated in FIG. 2. This configuration ensures that even if the coil spring 30 is broken, the outer portion 525 and the extending portion 526 of the lower spring seat 55 keep fragments of the coil spring 30 away from the tire 112. As a result, bursting of the tire 112 caused by the fragments of the coil spring 30 stuck in the tire 112 is prevented.

With the suspension 1 mounted on the vehicle, the lower spring seat 55 and coil spring 30 rotate together with the cylinder 10 in conjunction with the rotation of the wheel 110. Therefore, the extending portion 526 is provided over approximately a quarter of the circumference positioned in the vicinity of the tire 112. However, the extending portion 526 may be extended upwardly over the entire circumference of the outer portion 525 from the upper portion of the outer portion 525.

In the lower spring seat 55 configured as described above, the metal seat 510 is disposed at a portion to receive the load of the coil spring 30, and only the resin seat 520 is disposed at the outside of the metal seat 510. This configuration reduces the weight of the lower spring seat 55 compared with forming all part of the lower spring seat 55 of metal, resulting in a reduction in weight of the suspension 1.

Employing a resin as the material of the lower spring seat 55 enables the lower spring seat 55 to be formed into any desired shape in a mold. Therefore, even if the inner prevention portion 528, the outer prevention portion 529, the protrusion portions 530, and other elements necessitate protruding or depressed shapes, these shapes are more easily formed. That is, in the case where all part of the lower spring seat 55 is made of metal, it is necessary to make an uneven surface by pressing a metal plate using a plurality of molds in a plurality of steps. In contrast, the use of a resin as a material of a part of the lower spring seat 55 makes injection molding (injection molding) applicable, and this makes the lower spring seat more easily formed than a lower spring seat made of metal, even if an uneven, complicated shape is required.

Furthermore, the use of a resin increases the degree of freedom in shape, and the shapes of the inner prevention portion 528, the outer prevention portion 529, and the mounting surface 527 are more precisely adjusted to the shape of the lower end portion of the coil spring 30. This configuration prevents sand, for example, from entering the space between the coil spring 30 and the lower spring seat 55.

If all part of the lower spring seat 55 is made of metal, in order to prevent sound caused by direct contact with the metal coil spring 30, it is necessary to provide an elastic member such as a rubber between the lower spring seat 55 and the coil spring 30. However, in this embodiment, since the resin seat 520 exists at the portion to be in direct contact with the coil spring 30, it is not necessary to provide an elastic member.

Even though the lower spring seat 55 according to the fifth embodiment includes two portions, namely, the metal seat 510 and the resin seat 520, the rotation of the resin seat 520 with respect to the metal seat 510 is prevented. In other words, the lower spring seat 55 according to the fifth embodiment includes the position deviation prevention mechanism 400. By fitting the lower protrusion portion 531, which is disposed at the resin seat 520, to the through hole 515, which is formed in the metal seat 510, the rotation prevention is achieved.

That is, the lower spring seat 55 according to the fifth embodiment reduces in weight and prevents coming-off fragments of the coil spring 30 toward the wheel 110 by a simple configuration. Furthermore, generation of sound caused by the relative movement of the resin seat 520 to the metal seat 510 is prevented.

<Modifications of the Position Deviation Prevention Mechanism Between the Metal Seat and the Resin Seat>

Figure 19:
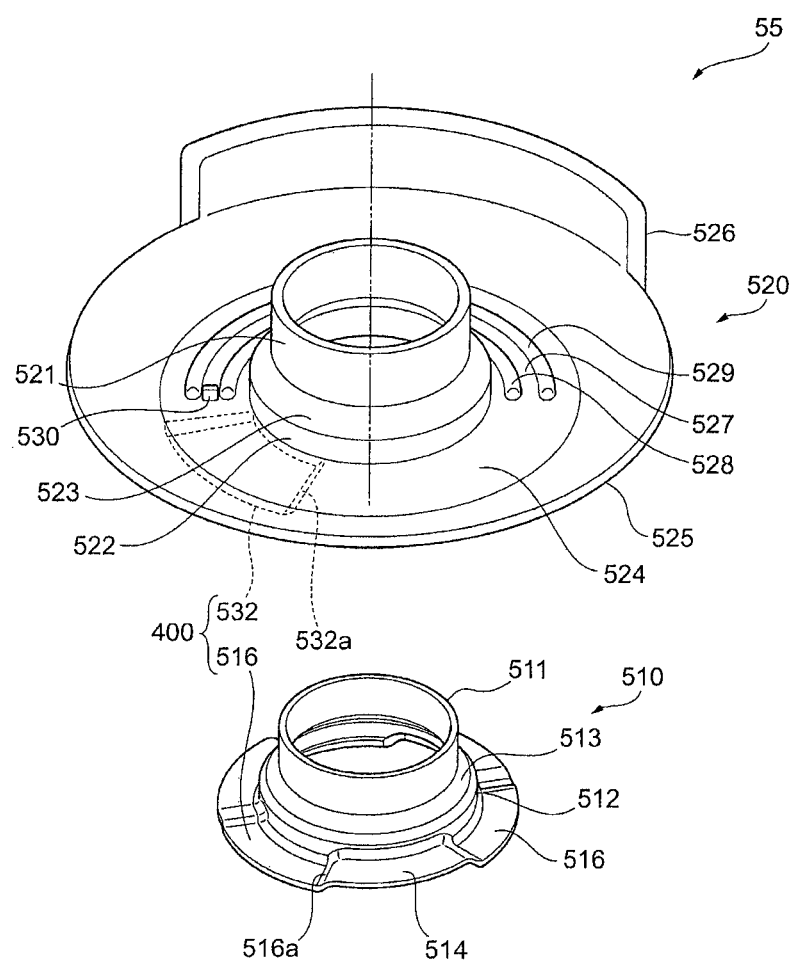
FIG. 19 is a view of a metal seat and a resin seat according to the first modification.

FIG. 19 is a view of the metal seat 510 and the resin seat 520 according to the first modification.

As illustrated in FIG. 19, the metal seat 510 according to the first modification includes, at the load mounting portion 514, a plurality of (three in this embodiment) depression portions 516 instead of the through hole 515 described above. The depression portions 516 are depressed downwardly over a predetermined region in the circumferential direction and formed at equal intervals in the circumferential direction. On the other hand, as illustrated in FIG. 19, the pressure mounting portion 524 of the resin seat 520 according to the first modification includes, instead of the lower protrusion portion 531 as described above, a lower protrusion portions 532, which protrude downwardly over a predetermined region in the circumferential direction. The plurality of (three in this embodiment) lower protrusion portions 532 are disposed at equal intervals in the circumferential direction along the shape of the depression portions 516 of the metal seat 510.

The metal seat 510 according to the first modification and the resin seat 520 according to the first modification are disposed so that the depression portion 516 of the metal seat 510 according to the first modification and the lower protrusion portion 532 of the pressure mounting portion 524 of the resin seat 520 according to the first modification are fitted to each other. In the case where the resin seat 520 according to the first modification is subjected to circumferential load from the coil spring 30, a surface 532*a*, which is perpendicular to the circumferential direction of the lower protrusion portion 532 of the resin seat 520 according to the first modification, is in contact with a surface 516*a*, which is perpendicular to the circumferential direction of the depression portion 516 of the metal seat 510 according to the first modification. Therefore, movement in the circumferential direction of the resin seat 520 with respect to the metal seat 510 according to the first modification is prevented.

That is, the position deviation prevention mechanism 400 according to the first modification includes: the lower protrusion portion 532 of the pressure mounting portion 524 (resin seat 520); and the depression portion 516, which is formed at the metal seat 510 according to the first modification.

Figure 20:
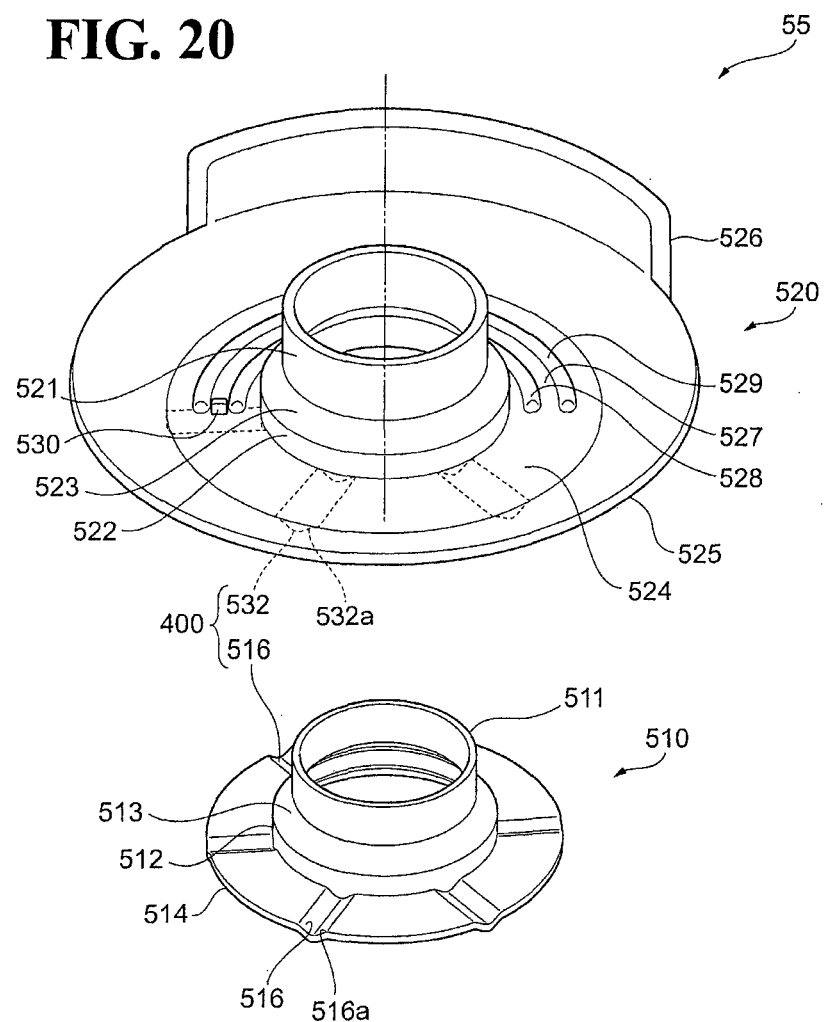
FIG. 20 is a view of another embodiment of the metal seat and the resin seat according to the first modification.

FIG. 20 is a view of another embodiment of the metal seat 510 and the resin seat 520 according to the first modification.

As illustrated in FIG. 20, a radial view (circumferential cross-section) of the depression portion 516 of the metal seat 510 may be depressed so as to be approximately U-shaped. The radial view (circumferential cross-section) of the lower protrusion portion 532 of the resin seat 520 may protrude in an approximately U-shape.

Figure 21:
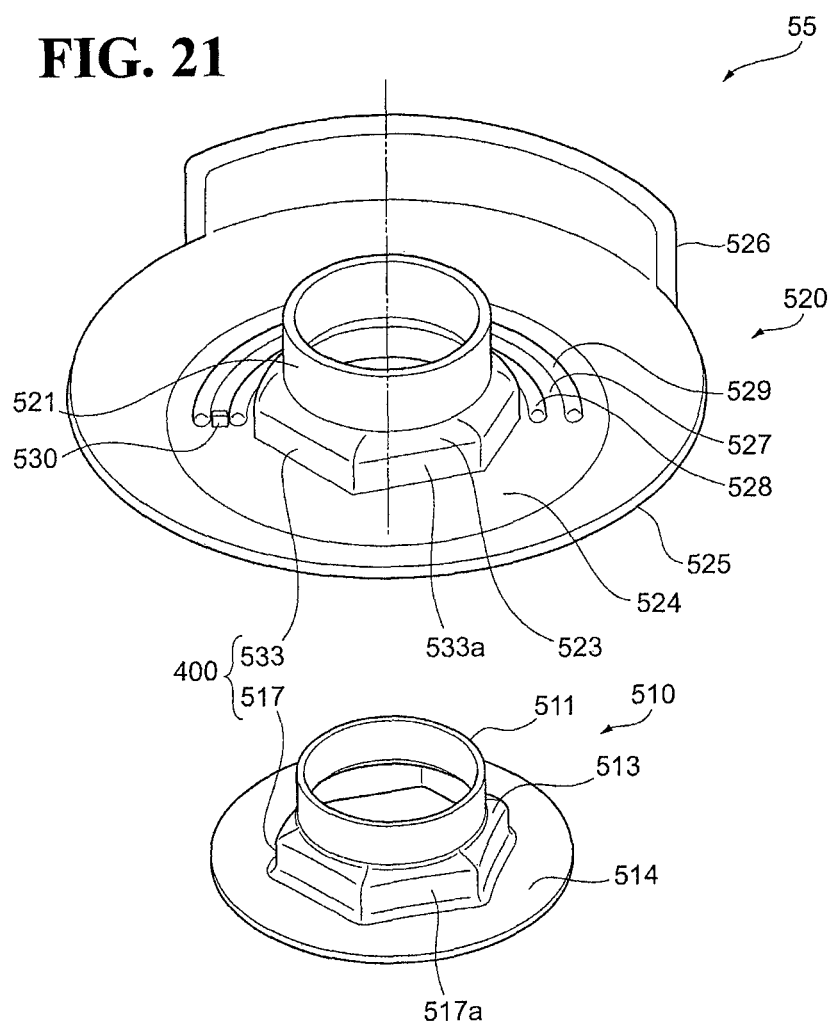
FIG. 21 is a view of a metal seat and a resin seat according to the second modification.

FIG. 21 is a view of the metal seat 510 and the resin seat 520 according to the second modification.

As illustrated in FIG. 21, the metal seat 510 according to the second modification includes, instead of the second hollow circular columnar portion 512 described above, a metal-side hexagonal hollow columnar portion 517, which has a hexagonal hollow columnar shape. On the other hand, as illustrated in FIG. 21, a resin seat 520 according to the second modification includes, instead of the second hollow circular columnar portion 522 described above, a resin-side hexagonal hollow columnar portion 533, which has a hexagonal hollow columnar shape. The resin-side hexagonal hollow columnar portion 533 of the resin seat 520 according to the second modification is shaped along the shape of the metal-side hexagonal hollow columnar portion 517 of the metal seat 510 according to the second modification.

The metal-side hexagonal hollow columnar portion 517 of the metal seat 510 according to the second modification and the resin-side hexagonal hollow columnar portion 533 of the resin seat 520 according to the second modification are fitted to each other. A resin-side rectangular surface 533*a*, which is perpendicular to the radial direction of the resin-side hexagonal hollow columnar portion 533 of the resin seat 520 according to the second modification faces a metal-side rectangular surface 517*a*, which is perpendicular to the radial direction of the metal-side hexagonal hollow columnar portion 517 of the metal seat 510 according to the second modification. When the resin seat 520 according to the second modification receives circumferential load from the coil spring 30, the resin-side rectangular surface 533*a* and the metal-side rectangular surface 517*a*, which face each other, come into contact with each other. This configuration prevents movement of the resin seat 520 according to the second modification in the circumferential direction of the resin seat 520 with respect to the metal seat 510 according to the second modification.

The position deviation prevention mechanism 400 includes: a first rectangle that is disposed at one of the metal seat 510 and the resin seat 520, which includes the pressure mounting portion 524; and a second rectangle that is disposed at the other one of the metal seat 510 and the resin seat 520 and that faces and is fitted to the first rectangle.

The position deviation prevention mechanism 400 according to the second modification includes: a metal-side rectangular surface 517*a*, which is an example of the first rectangle and disposed at the metal seat 510; and a resin-side rectangular surface 533*a*, which is an example of the second rectangle disposed at the resin seat 520 and which faces and is fitted to the metal-side rectangular surface 517*a*. The position deviation prevention mechanism 400 according to the second modification includes the resin-side hexagonal hollow columnar portion 533 of the resin seat 520 according to the second modification and the metal-side hexagonal hollow columnar portion 517 of the metal seat 510 according to the second modification.

Figure 22:
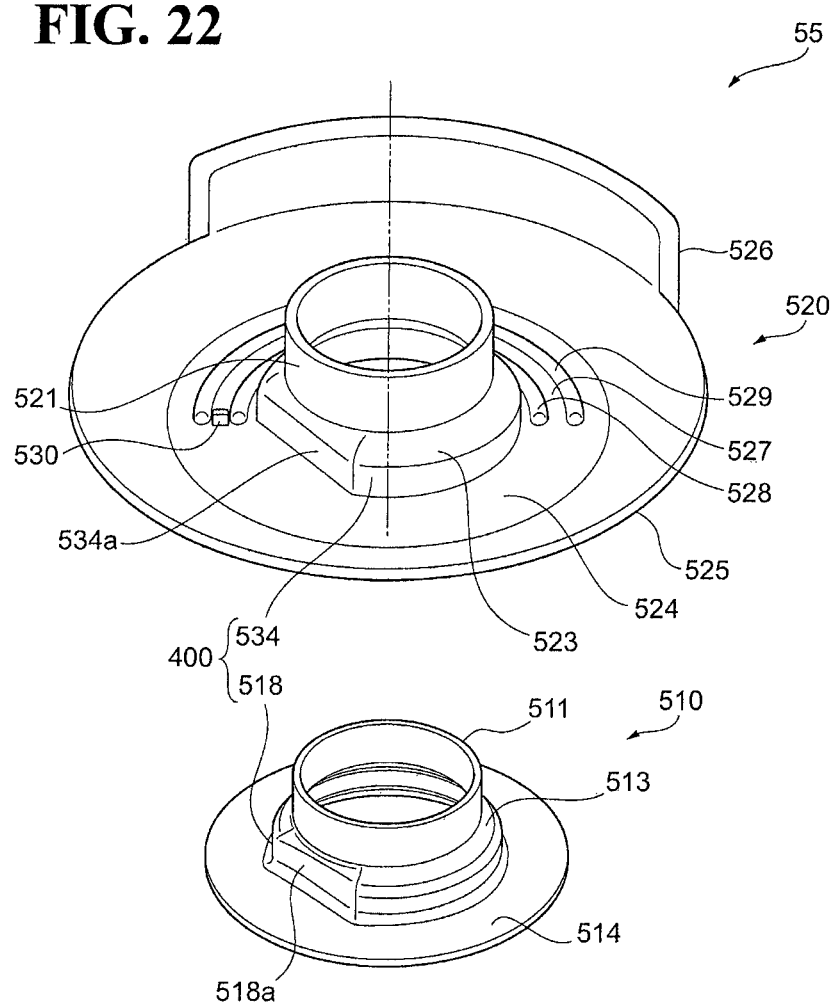
FIG. 22 is a view of a metal seat and a resin seat according to the third modification.

FIG. 22 is a view of the metal seat 510 and the resin seat 520 according to a third modification. As illustrated in FIG. 22, the metal seat 510 according to the third modification includes, instead of the second hollow circular columnar portion 512 described above, what is called a D-shaped hollow columnar metal-side D-shaped portion 518, in which a metal-side rectangular surface 518*a*, which has a rectangular shape, is formed at a part of the hollow circular column. On the other hand, the resin seat 520 according to the third modification includes, instead of the second hollow circular columnar portion 522 described above, what is called a D-shaped, hollow columnar resin-side D-shaped portion 534, in which a resin-side rectangular surface 534*a*, which has a rectangular shape, is formed at a part of the hollow circular column.

The metal-side D-shaped portion 518 of the metal seat 510 according to the third modification and the resin-side D-shaped portion 534 of the resin seat 520 according to the third modification are fitted to each other. The resin-side rectangular surface 534*a*, which is perpendicular to the radial direction of the resin-side D-shaped portion 534 of the resin seat 520 according to the third modification, faces the metal-side rectangular surface 518*a*, which is perpendicular to the radial direction of the metal-side D-shaped portion 518 of the metal seat 510 according to the third modification. When the resin seat 520 according to the third modification receives circumferential load from the coil spring 30, the resin-side rectangular surface 534*a* and the metal-side rectangular surface 518*a*, which face each other in the radial direction, come into contact with each other. This configuration prevents movement of the resin seat 520 according to the third modification in the circumferential direction with respect to the metal seat 510 according to the third modification.

That is, the position deviation prevention mechanism 400 according to the third modification includes: the metal-side rectangular surface 518*a*, which is an example of the first rectangle and disposed at the metal seat 510; and the resin-side rectangular surface 534*a*, which is an example of the second rectangle disposed at the resin seat 520 and which faces and is fitted to the metal-side rectangular surface 518*a*. The position deviation prevention mechanism 400 according to the third modification includes the resin-side D-shaped portion 534 of the resin seat 520 according to the third modification and the metal-side D-shaped portion 518 of the metal seat 510 according to the third modification.

The lower spring seat 55 may include the position deviation prevention mechanism 400 according to the second modification or the position deviation prevention mechanism 400 according to the third modification, together with the position deviation prevention mechanism 400 including the lower protrusion portion 531 of the resin seat 520 of the above-described embodiments and the through holes 515 of the metal seat 510.

The lower spring seat 55 may include the position deviation prevention mechanism 400 according to the second modification or the position deviation prevention mechanism 400 according to the third modification, together with the position deviation prevention mechanism 400 according to the first modification.

Sixth Embodiment

Next, a lower spring seat 56 according to a sixth embodiment will be described.

Figure 23:
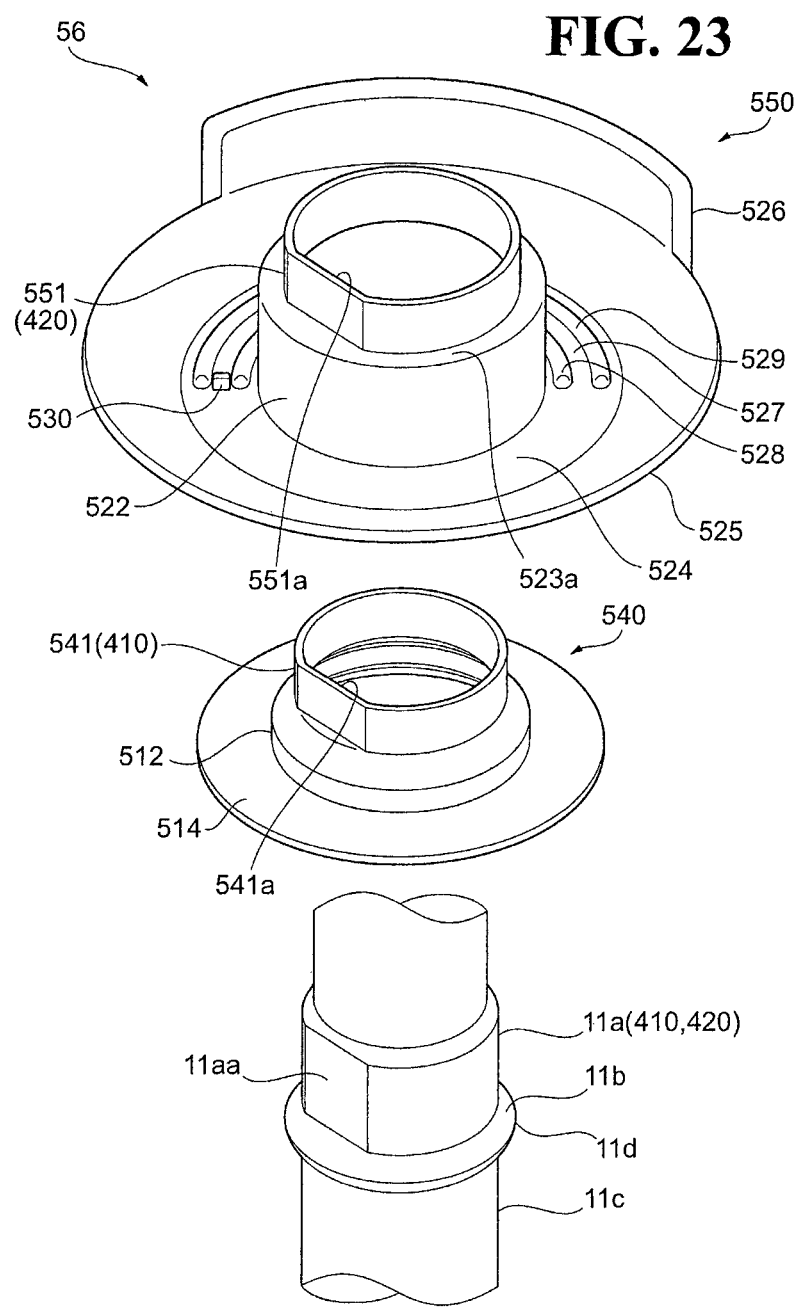
FIG. 23 is a perspective view of a metal seat and a resin seat.

FIG. 23 is a perspective view of a metal seat 540 and a resin seat 550.

Figure 24:
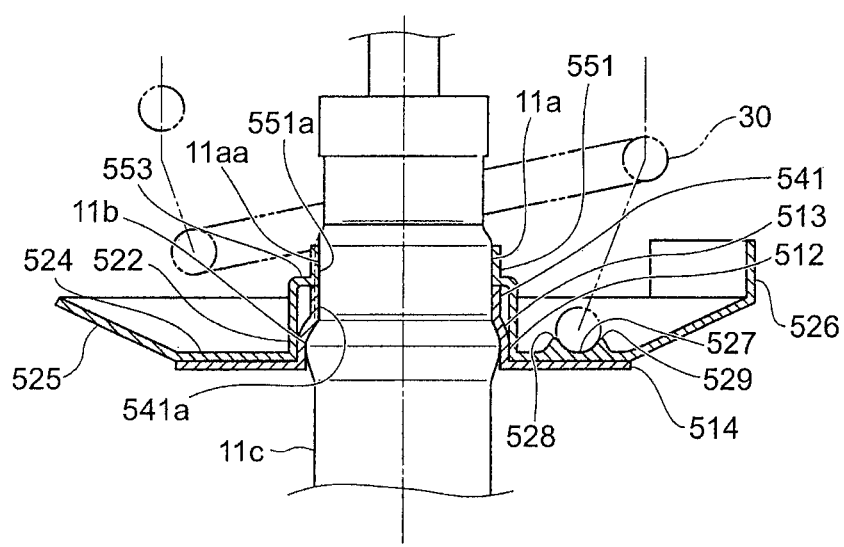
FIG. 24 is a cross-sectional view of a lower spring seat according to a sixth embodiment.

FIG. 24 is a cross-sectional view of a lower spring seat 56 according to the sixth embodiment.

The lower spring seat 56 according to the second embodiment includes a metal seat 540, which is mounted on the periphery of the cylinder 10 to receive the load from the coil spring 30 so as to prevent relative rotation with respect to the cylinder 10. The lower spring seat 56 includes the resin seat 550, which is disposed between the coil spring 30 and the wheel and is mounted on the cylinder 10 so as to prevent relative rotation with respect to the metal seat 540.

The following description will mainly focus on respects different from the lower spring seat 55 according to the fifth embodiment.

The outer cylinder 11 of the cylinder 10 according to the sixth embodiment is different from the outer cylinder 11 of the cylinder 10 according to the fifth embodiment in that the fitting portion 11*a* described above is, as illustrated in FIG. 23, what is called a D-shaped and hollow column, in which a cylinder-side rectangular surface 11*aa*, which has a rectangular shape, is formed at a part of the hollow circular columnar shape.

The metal seat 540 according to the sixth embodiment is different from the metal seat 510 according to the fifth embodiment in that instead of the first hollow circular columnar portion 511 described above, the metal seat 540 includes what is called a D-shaped hollow columnar D-shaped portion 541, in which a metal-side rectangular surface 541*a*, which has a rectangular shape, is formed at a part of the hollow circular column.

The D-shaped portion 541 is fitted to the fitting portion 11*a* of the outer cylinder 11. Here, the metal-side rectangular surface 541*a* of the metal seat 540 and the cylinder-side rectangular surface 11*aa* of the cylinder 10, which are rectangular surfaces formed at a part in the circumferential direction, are disposed so as to face each other in the radial direction.

The resin seat 550 according to the sixth embodiment is different from the resin seat 520 according to the fifth embodiment in that the resin seat 550 includes, instead of the first hollow circular columnar portion 521 described above, what is called a FD-shaped and hollow columnar D-shaped portion 551, in which a resin-side rectangular surface 551*a* is formed at a part of the hollow columnar shape. The shape of the D-shaped portion 551 of the resin seat 550 is the same as the shape of the D-shaped portion 541 of the metal seat 540.

The resin seat 550 according to the sixth embodiment includes, instead of the inclined portion 523 described above, a connection portion 523*a*, which extends from the lower end portion of the D-shaped portion 551 to the outside in a direction perpendicular to the vertical direction and which is connected to the upper end portion of the second hollow circular columnar portion 522.

As illustrated in FIG. 24, the D-shaped portion 551 is fitted to the fitting portion 11*a* of the outer cylinder 11 so as to be positioned above the D-shaped portion 541 of the metal seat 540. Here, the resin-side rectangular surface 551*a* of the resin seat 550 and the cylinder-side rectangular surface 11*aa* of the cylinder 10, which are rectangular surfaces each formed at a part in the circumferential direction, are disposed so as to face each other in the radial direction.

The position deviation prevention mechanism 400 according to the sixth embodiment includes: a first position deviation prevention mechanism 410, which prevents position deviation between the cylinder 10 and the metal seat 540; and a second position deviation prevention mechanism 420, which prevents position deviation between the cylinder 10 and the resin seat 550.

The position deviation prevention mechanism 400 includes: a third rectangle disposed at one of the metal seat 540 and the cylinder 10; and a fourth rectangle, which is disposed at the other one of the metal seat 540 and the cylinder 10 and which faces and is fitted to the third rectangle.

The first position deviation prevention mechanism 410 according to the sixth embodiment includes: the cylinder-side rectangular surface 11*aa*, which is an example of the third rectangle disposed at the cylinder 10; and the metal-side rectangular surface 541*a*, which is an example of the fourth rectangle disposed at the metal seat 540 and which faces and is fitted to the cylinder-side rectangular surface 11*aa*. The first position deviation prevention mechanism 410 according to the sixth embodiment includes the D-shaped portion 541 of the metal seat 540 according to the sixth embodiment and the fitting portion 11a of the outer cylinder 11 of the cylinder 10.

The second position deviation prevention mechanism 420 according to the sixth embodiment includes: the cylinder-side rectangular surface 11aa, which is an example of the third rectangle disposed at the cylinder 10; and the resin-side rectangular surface 551a, which is an example of the fifth rectangle disposed at the resin seat 550 and which faces and is fitted to the cylinder-side rectangular surface 11aa. The second position deviation prevention mechanism 420 according to the sixth embodiment includes a D-shaped portion 651 of a resin seat 650 according to the sixth embodiment and the fitting portion 11a of the outer cylinder 11 of the cylinder 10.

The resin seat 550 according to the sixth embodiment is different from the resin seat 520 according to the fifth embodiment in that the resin seat 550 does not include the position deviation prevention mechanism between the metal seat 540 according to the sixth embodiment and the resin seat 550.

The lower spring seat 56 according to the sixth embodiment includes the first position deviation prevention mechanism 410 and the second position deviation prevention mechanism 420. This configuration prevents position deviation between the metal seat 540 according to the sixth embodiment and the resin seat 550 according to the sixth embodiment.

<Modifications of the First Position Deviation Prevention Mechanism 410 and the Second Position Deviation Prevention Mechanism 420>

Figure 25:
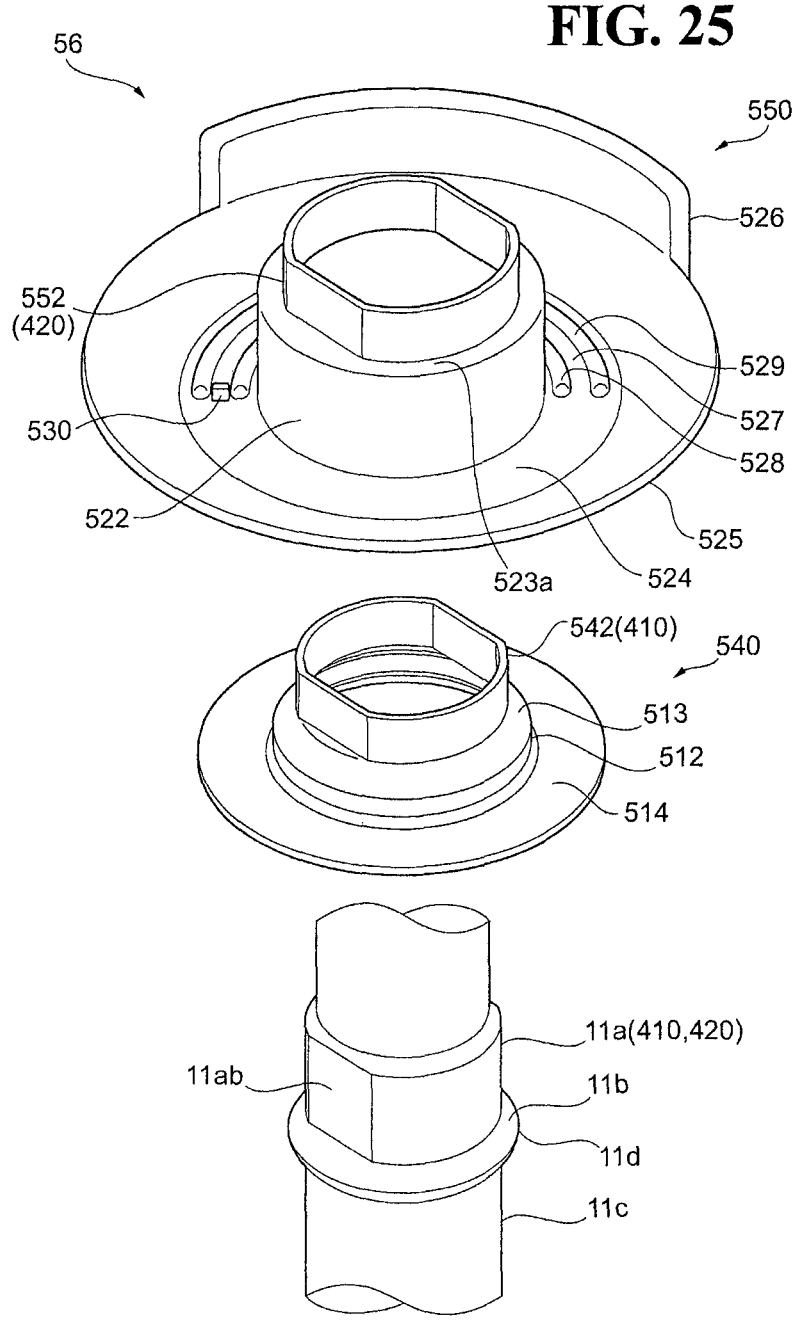
FIG. 25 is a view of a first position deviation prevention mechanism and a second position deviation prevention mechanism according to the first modification.

FIG. 25 is a view of the first position deviation prevention mechanism 410 and the second position deviation prevention mechanism 420 according to the first modification.

The fitting portion 11a of the cylinder 10 according to the first modification is, as illustrated in FIG. 25, what is called a two-side cut shaped and hollow column, in which rectangular surfaces 11ab are formed at two facing hollow circular columnar portions.

As illustrated in FIG. 25, the metal seat 540 according to the first modification includes, instead of the D-shaped hollow columnar D-shaped portion 541, a two-side cut portion 542 along the two-side cut shape of the fitting portion 11a of the cylinder 10.

The first position deviation prevention mechanism 410 according to the first modification includes the fitting portion 11a of the cylinder 10 according to the first modification and the two-side cut portion 542 of the metal seat 540 according to the first modification.

Similarly to the metal seat 540 according to the first modification, the resin seat 550 according to the first modification includes, instead of the D-shaped portion 551, a two-side cut portion 552 along the shape of the fitting portion 11a of the cylinder 10.

The second position deviation prevention mechanism 420 according to the first modification includes the fitting portion 11a of the cylinder 10 according to the first modification and the two-side cut portion 552 of the resin seat 550 according to the first modification.

Figure 26:
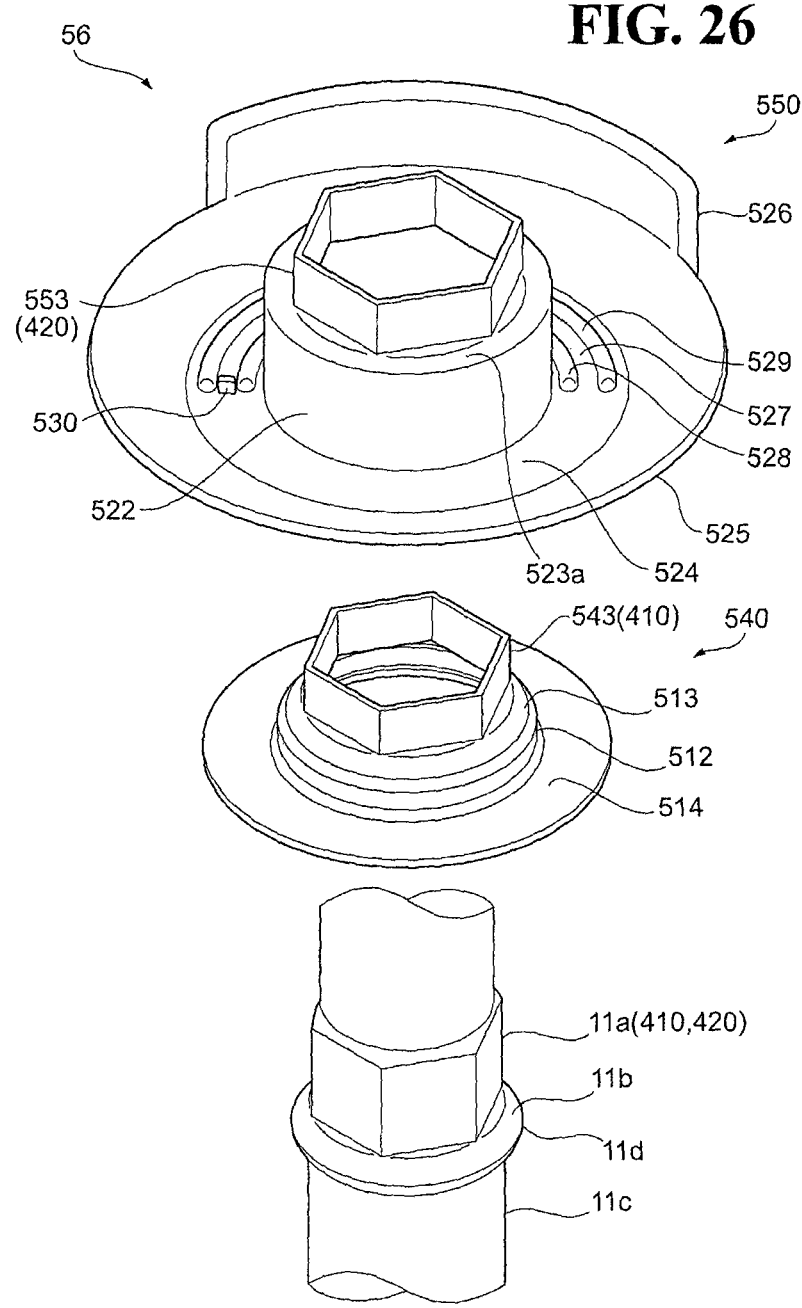
FIG. 26 is a view of a modification of a first position deviation prevention mechanism and a second position deviation prevention mechanism according to the second modification.

FIG. 26 is a view of a modification of the first position deviation prevention mechanism 410 and the second position deviation prevention mechanism 420 according to the second modification.

The fitting portion 11a of the cylinder 10 according to the second modification has, as illustrated in FIG. 26, a hexagonal hollow column.

As illustrated in FIG. 26, the metal seat 540 according to the second modification includes, instead of the D-shaped and hollow columnar D-shaped portion 541, a hollow hexagonal columnar portion 543 along the hollow hexagonal columnar shape of the fitting portion 11a of the cylinder 10.

The first position deviation prevention mechanism 410 according to the second modification includes the fitting portion 11a of the cylinder 10 according to the first modification and the hollow hexagonal columnar portion 543 of the metal seat 540 according to the first modification.

Similarly to the metal seat 540 according to the second modification, the resin seat 550 according to the second modification includes, instead of the D-shaped portion 551, a hexagonal hollow columnar portion 553, which has a hexagonal hollow columnar shape, along the shape of the fitting portion 11a of the cylinder 10.

The second position deviation prevention mechanism 420 according to the second modification includes the fitting portion 11a of the cylinder 10 according to the second modification and the hexagonal cylinder portion 553 of the resin seat 550 according to the second modification.

Figure 27:
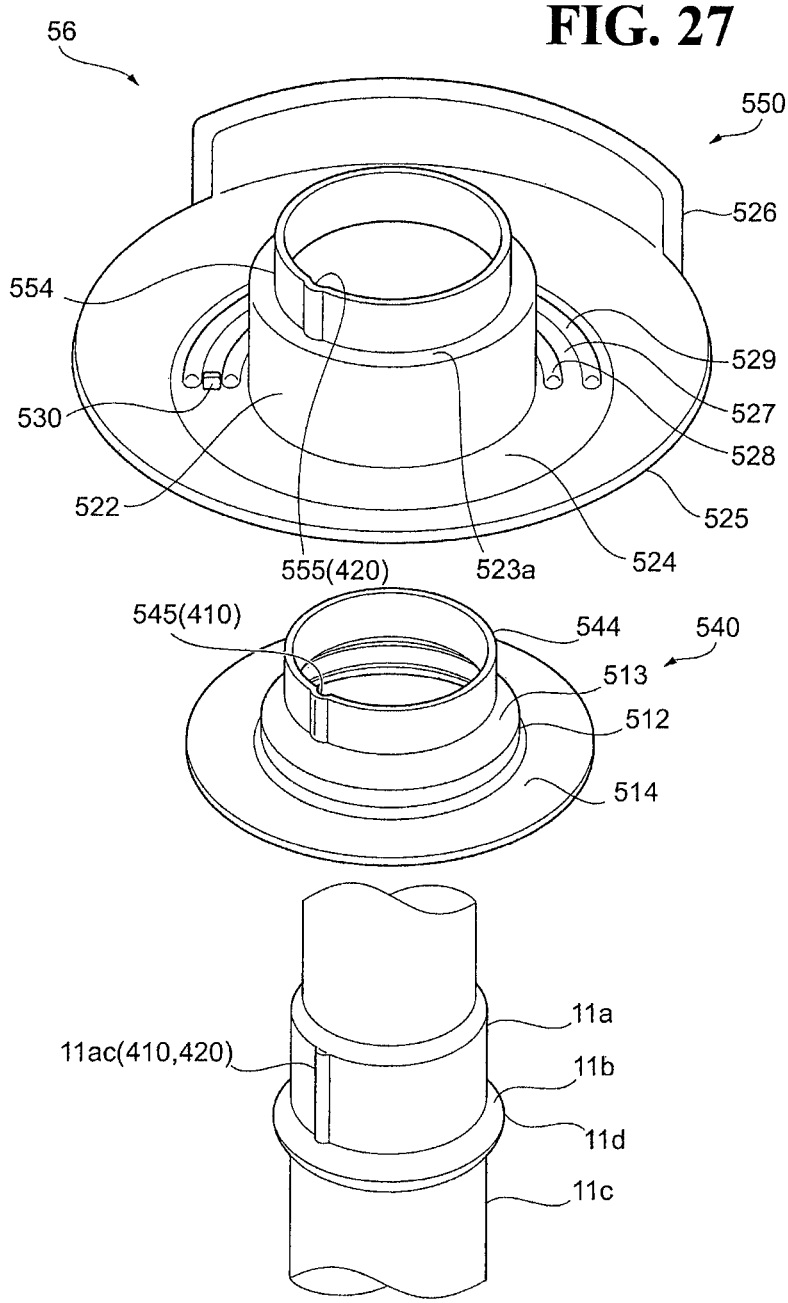
FIG. 27 is a view of a modification of a first position deviation prevention mechanism and a second position deviation prevention mechanism according to the third modification.

FIG. 27 is a view of a modification of the first position deviation prevention mechanism 410 and the second position deviation prevention mechanism 420 according to the third modification.

As illustrated in FIG. 27, the fitting portion 11a of the cylinder 10 according to the third modification includes a protrusion 11ac, which protrudes radially outward at a part of the hollow circular columnar outer circumferential surface and extends in the vertical direction.

As illustrated in FIG. 27, the metal seat 540 according to the third modification is, instead of the D-shaped portion 541, the hollow circular columnar portion 544 and has such a configuration that at a part of the inner circumferential surface of the hollow circular columnar portion 544, a groove 545 extends in the vertical direction along the protrusion 11ac of the fitting portion 11a of the cylinder 10.

The first position deviation prevention mechanism 410 according to the third modification includes the protrusion 11ac of the fitting portion 11a of the cylinder 10 according to the third modification and the groove 545 of the hollow circular columnar portion 544 of the metal seat 540 according to the third modification.

Similarly to the metal seat 540 according to the third modification, the resin seat 550 according to the third modification includes, instead of the D-shaped portion 551, the hollow circular columnar portion 554, and has such a configuration that at a part of the inner circumferential surface of the hollow circular columnar portion 554, a groove 555 extends in the vertical direction along the protrusion 11ac of the fitting portion 11a of the cylinder 10.

The second position deviation prevention mechanism 420 according to the third modification includes the protrusion 11ac of the fitting portion 11a of the cylinder 10 according to the third modification and the groove 555 of the hollow circular columnar portion 554 of the resin seat 550 according to the third modification.

In the first position deviation prevention mechanism 410 and the second position deviation prevention mechanism 420 according to the first to third modifications as well, rotation of the metal seat 540 and the resin seat 550 with respect to the cylinder 10 is prevented. As a result, relative movement of the resin seat 550 to the metal seat 540 is also prevented, and generation of sound caused by the relative movement of the resin seat 550 to the metal seat 540 is prevented.

Although not illustrated in the drawings, the first position deviation prevention mechanism 410 and the second position deviation prevention mechanism 420 according to the sixth embodiment as illustrated in FIG. 23 and FIG. 24 and the first position deviation prevention mechanism 410 and the second position deviation prevention mechanism 420 according to the third modification as illustrated in FIG. 27 may be combined together. The first position deviation prevention mechanism 410 and the second position deviation prevention mechanism 420 according to the third modification and the first position deviation prevention mechanism 410 and the second position deviation prevention mechanism 420 according to the second or third modification may be combined together.

<Modifications of the Resin Seat>

Next, modifications of the resin seat will be described.

In the resin seat 520 according to the fifth embodiment and the extending portion 526 of the resin seat 540 according to the sixth embodiment, as with the enlarged diameter portion 318 of the lower spring sheet 33 according to the third embodiment as illustrated in FIG. 8(b), the strengthening member 331, which is made of a material higher in strength than the base materials of the resin seats 520 and 540, may be casted. For example, in the extending portion 526, as illustrated in FIG. 8(b) and FIG. 8(c), the strengthening member 331 may be insert-molded.

In the lower spring seats 55 and 56 provided with the resin seats 520 and 540 with the strengthening member 331, even if the coil spring 30 is broken, and if fragments of the coil spring 30 are directed with force toward the tire 112, breakage of the resin seats 520 and 540 themselves is prevented more reliably. This is because the resin seats 520 and 540 include the extending portion 326, which includes the strengthening member 331, which is made of a material that is higher in strength. As a result, bursting of the tire 112 caused by the fragments of the coil spring 30 stuck in the tire 112 is prevented more reliably.

Seventh Embodiment

The lower spring seat 57 according to the seventh embodiment will be described.

FIG. 28(a) is a perspective view of the metal seat and the resin seat seen from above, and FIG. 28(b) is a perspective view of the resin seat seen from below.

Figure 29:
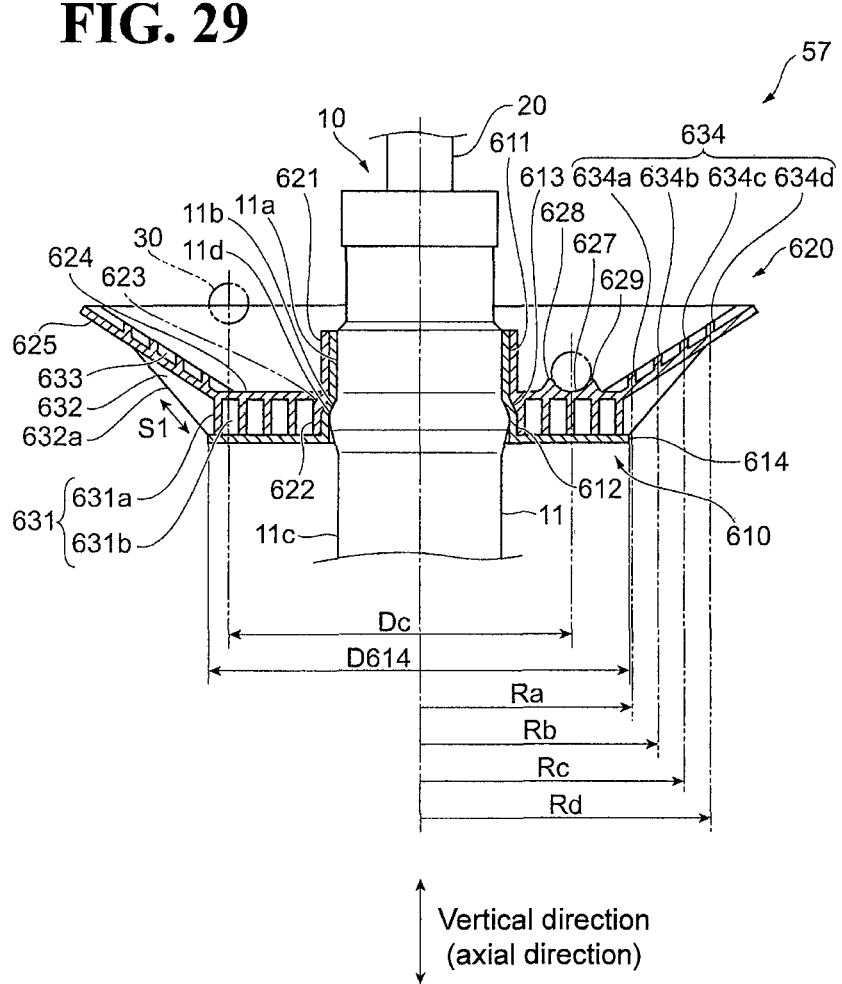
FIG. 29 is an enlarged cross-sectional view of the lower spring seat.

FIG. 29 is an enlarged cross-sectional view of the lower spring seat 57.

The lower spring seat 57 according to the seventh embodiment is a spring seat that is mounted on the cylinder 10, which contains the damper device, and that supports the wheel-side end portion of the coil spring 30, which is disposed between the vehicle body and the wheel. The lower spring seat 57 includes a metal seat 610, which is an example of the reinforcing member disposed at the periphery of the cylinder 10 to support the coil spring 30; and a resin seat 620, which is an example of the resin member. The resin seat 620 includes: a pressure mounting portion 624, which is an example of the mounting portion disposed on the vehicle body side of the metal seat 610 and on which the end portion on the wheel 110 side of the coil spring 30 rests; an outer portion 625, which is disposed outside in the radial direction of the pressure mounting portion 624; and a lower surface-side inclined rib 632, which is an example of the supporting portion connected to the outer portion 625 and supported by the metal seat 610. The outer portion 625, the lower surface-side inclined rib 632 and other elements serve the functions of the intermediate portion that is disposed on the side of the pressure mounting portion 624 opposite to the cylinder 10 and that is disposed between the coil spring 30 and the wheel 110.

The lower spring seat 57 includes the position deviation prevention portion 450, which prevents position deviation of at least two adjacent members among the metal seat 610, the pressure mounting portion 624 (the resin seat 620), and the cylinder 10.

The metal seat 610, the resin seat 620, and the position deviation prevention mechanism 450 will be described in detail below.

(Configuration of the Metal Seat)

The metal seat 610 includes: a first hollow circular columnar portion 611, which has a hollow circular columnar shape and which extends in the vertical direction; and what is called a D-shaped and hollow columnar D-shaped portion 612, in which a metal-side rectangular surface 612a, which has a rectangular shape, is formed at a part of the hollow circular columnar shape below the first hollow circular columnar portion 611. The metal seat 610 includes an inclined portion 613, which is inclined with respect to the vertical direction so as to connect the first hollow circular columnar portion 611 to the D-shaped portion 612. The metal seat 610 includes a load mounting portion 614, which extends from the lower end portion of the D-shaped portion 612 to the outside in the direction perpendicular to the vertical direction to receive the load from the coil spring 30.

As illustrated in FIG. 29, the outer cylinder 11 of the cylinder 10 includes: the cylinder portion 11c; the fitting portion 11a, which is fitted to the first hollow circular columnar portion 611 of the metal seat 610; and the position determination portion 11b, which protrudes radially outward with respect to the cylinder portion 11c to determine the position of the metal seat 610 in the vertical direction.

The fitting portion 11a is a portion with approximately the same shape as the cylinder portion 11c.

The position determination portion 11b includes a protrusion portion 11d, which protrudes radially outward with respect to the fitting portion 11a.

The outer cylinder 11 is formed by press-working a metal pipe. Here, an example is that the position determination portion 11b and other portions are formed by bulge forming. The cylinder portion 11c and the fitting portion 11a may be formed using one pipe, and the position determination portion 11b as a separate member may be fixed to the pipe by welding or some other method.

The inner diameter of the first hollow circular columnar portion 611 of the metal seat 610 and the outer diameter of the fitting portion 11a of the outer cylinder 11 have such a dimensional relationship that the first hollow circular columnar portion 611 and the fitting portion 11a are tightly fitted to each other. That is, the metal seat 610 is fixed to the outer cylinder 11 by press-fitting the first hollow circular columnar portion 611 to the fitting portion 11a of the outer cylinder 11.

The inner diameter of the D-shaped portion 612 is set to equal to or larger than the outer diameter of the position determination portion 11b of the outer cylinder 11.

The inclined portion 613 is inclined so that its diameter gradually increases toward the lower direction. By contacting the inclined portion 613 with the position determination portion 11b of the outer cylinder 11, downward movement of the metal seat 610 is prevented. In other words, at the time when the metal seat 610 is being press-fitted to the outer cylinder 11, the press-fitting continues until the inclined portion 613 meets the position determination portion 11b, and this determines the positions of the metal seat 610 and the outer cylinder 11 in the vertical direction.

The load mounting portion 614 is basically a disk-shaped portion. As illustrated in FIG. 29, the outer diameter D614 is larger than the central diameter Dc at the lower end portion of the coil spring 30 (D614>Dc).

(Configuration of the Resin Seat)

The resin seat 620 includes: a first hollow circular columnar portion 621, which has a hollow circular columnar shape and which extends in the vertical direction; and what is called a D-shaped hollow columnar D-shaped portion 622, in which a resin-side rectangular surface 622a, which has a rectangular shape, is formed at a part of the hollow circular columnar shape below the first hollow circular columnar portion 621. The resin seat 620 includes an inclined portion 623, which is inclined with respect to the vertical direction so as to connect the first hollow circular columnar portion 621 and the D-shaped portion 622.

The resin seat 620 includes: a pressure mounting portion 624, which extends from the inclined portion 623 to the outside in a direction perpendicular to the vertical direction; and the outer portion 625, which is disposed outside of the pressure mounting portion 624.

The outer portion 625 is inclined from the surface on the coil spring 30 side of the pressure mounting portion 624 to the vehicle side. The outer portion 625 is formed over the entire circumference so as to gradually extend the diameter upwardly from the outermost diameter portion of the pressure mounting portion 624.

The resin seat 620 includes a mounting surface 627 on the coil spring 30-side surface of the pressure mounting portion 624 for the lower end portion of the coil spring 30 to rest on the mounting surface 627.

The resin seat 620 includes, on the pressure mounting portion 624, an inner prevention portion 628 and an outer prevention portion 629, which are respectively disposed inside and outside in the radial direction of the mounting surface 627. The inner prevention portion 628 and the outer prevention portion 629 protrude upwardly from the pressure mounting portion 624 to prevent radially inward and outward movement of the lower end portion of the coil spring 30.

Since the number of end turns of the coil spring 30 according to this embodiment is ½, the lower end portion of the coil spring 30 is in contact with the mounting surface 627 over approximately 180 degrees. The inner prevention portion 628 and the outer prevention portion 629 prevent the lower end portion of the coil spring 30 from moving over approximately 180 degrees.

The resin seat 620 includes a rectangular parallelepiped upper protrusion portion 630, which protrudes upwardly from the pressure mounting portion 624 at a starting point of the inner prevention portion 628 and the outer prevention portion 629. By the contact of the tip of the lower end portion of the coil spring 30 with the upper protrusion portion 630, the rotation of the coil spring 30 in a circumferential direction is prevented. The angle at which the lower end portion of the coil spring 30 and the mounting surface 627 are brought into contact with each other may be other than 180 degrees.

The resin seat 620 includes a rib disposed between the coil spring 30 and the wheel 110. For example, the resin seat 620 includes a lower rib 631, which is an example of the third rib on a side surface (lower surface) on the metal seat 610 side of the pressure mounting portion 624. The lower rib 631 is a rib extending downwardly from the surface (lower surface) on the metal seat 610 side of the pressure mounting portion 624 toward the load mounting portion 614 of the metal seat 610. The resin seat 620 includes the lower surface-side inclined rib 632, which extends from the side surface on the metal seat 610 side of the outer portion 625 toward the load mounting portion 614 of the metal seat 610 such that a tip 632a is oriented in a diagonal direction (the direction of the arrow S1 in FIG. 29) with respect to the vertical direction.

As illustrated in FIG. 28(b), the lower rib 631 includes: a plurality of lower surface-side circumferential direction ribs 631a, which extend in the circumferential direction; and a plurality of lower surface-side radial direction ribs 631b, which extend in the radial direction. As illustrated in FIG. 28(b), the lower surface-side inclined rib 632 is a rib that extends in the radial direction and that is formed so as to be continuous to the lower surface-side radial direction rib 631b of the lower rib 631. The tip (lower end portion) 632a of the lower surface-side inclined rib 632 is inclined to the vertical direction. The lower surface-side inclined rib 632 is connected to the outer portion 625 to function as an example of the supporting portion supported by the metal seat 610.

The resin seat 620 includes an upper surface-side inclined rib 633, which is an example of the first rib on the side surface on the coil spring 30 side of the outer portion 625. As illustrated in FIG. 28(a), the upper surface-side inclined rib 633 is a rib that extends in the diagonal direction so as to connect the surface (upper surface) on the coil spring 30 side of the pressure mounting portion 624 and the side surface on the coil spring 30 side of the outer portion 625.

The upper surface-side inclined rib 633 is a rib that extends in the radial direction. A plurality of upper surface-side inclined ribs 633 are provided in the circumferential direction.

The resin seat 620 includes, on the side surface on the coil spring 30 side of the outer portion 625, an upper surface-side circumferential direction rib 634, which extends in the circumferential direction so as to connect the upper-side inclined ribs 633 adjacent to each other.

A plurality of upper surface-side circumferential direction ribs 634 are provided in the radial direction. In the example illustrated in FIG. 28(a), the upper face-side circumferential direction rib 634 includes: a first upper surface-side circumferential direction rib 634a, which is the first rib on the bottom; a second upper surface-side circumferential direction rib 634b, which is the second rib from the bottom; a third upper surface-side circumferential direction rib 634c, which is the third rib from the bottom; and a fourth upper surface-side circumferential direction rib 634d, which is the fourth rib from the bottom. The radii of the first upper surface-side circumferential direction rib 634a, the second upper surface-side circumferential direction rib 634b, the third upper surface-side circumferential direction rib 634c, and the fourth upper surface-side circumferential direction rib 634d are respectively referred to as Ra, Rb, Re, and Rd. In this case, Ra<Rb<Rc<Rd.

In the resin seat 620, a discharge hole 625h and a slit 334s are formed as examples of a discharge mechanism to discharge liquid such as water that may accumulate on the side surface on the coil spring 30 side. The discharge hole 625h and the slit 334s discharge liquid from the side surface on the coil spring 30 side to the wheel side. One discharge hole 625h is formed between every two upper surface-side inclined ribs 633. In the example illustrated in FIG. 28(a), the discharge hole 625h is formed between the second upper surface-side circumferential direction rib 634b and the third upper surface-side circumferential direction rib 634c. In the third upper surface-side circumferential direction rib 634c and the fourth upper surface-side circumferential direction rib 634d, which are disposed upwardly with respect to the discharge hole 625h, slits 634s are formed so as to guide the liquid toward the second upper surface-side circumferential direction rib 634b, which are disposed below. As a result, liquid accumulated in the third upper surface-side circumferential direction rib 634c and the fourth upper surface-side circumferential direction rib 634d is discharged through the slits 634s and discharge holes 625h downwardly to the resin seat 620. It is preferable that the outer portion 625 is inclined so as to keep the discharge holes 625h low.

Also in the pressure mounting portion 624 of the resin seat 620, a discharge hole 624h is formed, which is an example of the discharge mechanism to discharge liquid that may accumulate on the side surface on the coil spring 30 side toward the wheel side. One discharge hole 624h is formed between every two upper surface-side inclined ribs 633. In the first upper surface-side circumferential direction rib 634a, which is disposed upwardly with respect to the discharge hole 625h, slits 634s are formed so as to guide the liquid toward the pressure mounting portion 624. As a result, the liquid accumulated in the first upper surface-side circumferential direction rib 634a is discharged through the slits 634s and discharge holes 625h downwardly to the resin seat 620. The slit 634s, which is formed at the first upper surface-side circumferential direction rib 634a, functions as an example of the discharge mechanism to discharge the liquid from the side surface (upper surface) on the coil spring 30 side through the discharge hole 624h toward the wheel side. It is preferable that the pressure mounting portion 624 is inclined so as to keep the discharge holes 624h low.

Examples of the material of the resin seat 620 include ABS, engineering plastics, polycarbonate, urethane, and nylon.

In the metal seat 610 and the resin seat 620 as described above, the sizes of the first hollow circular columnar portion 621, the D-shaped portion 622, and the inclined portion 623 of the resin seat 620 are respectively larger than the sizes of the first hollow circular columnar portion 611, the D-shaped portion 612, and the inclined portion 613 of the metal seat 610. The resin seat 620 and the metal seat 610 are loosely fitted to each other.

The metal seat 610 and the resin seat 620 are aligned vertically in an overlapping manner so that the lower end portion of the lower rib 631 and the lower surface-side inclined rib 632 of the resin seat 620 are in contact with the surface (upper surface) on the load mounting portion 614 side of the metal seat 610. This configuration prevents downward movement of the resin seat 620.

The D-shaped portion 612 of the metal seat 610 and the D-shaped portion 622 of the resin seat 620 are fitted to each other. The metal-side rectangular surface 612a and the resin-side rectangular surface 622a, which are rectangular surfaces respectively formed at a part in the circumferential direction of the D-shaped portion 612 and the D-shaped portion 622, are disposed so as to face each other in the radial direction. In the case where the resin seat 620 receives circumferential load from the coil spring 30, the metal-side rectangular surface 612a and the resin-side rectangular surface 622a, which face in the radial direction, come into contact with each other. In this manner, rotation of the resin seat 620 with respect to the metal seat 610 is prevented. That is, the position deviation prevention mechanism 450 described above includes the D-shaped portion 612 of the metal seat 610 and the D-shaped portion 622 of the resin seat 620.

By the position deviation prevention mechanism 450, the rotation of the resin seat 620 with respect to the metal seat 610 is prevented, and thus generation of sound caused by the relative movement of the resin seat 620 to the metal seat 610 is prevented.

In the lower spring seat 57 configured as described above, the metal seat 610 is disposed at the portion to receive the load from the coil spring 30, and only the resin seat 620 is provided outside of the portion that receives the load from the coil spring 30. This configuration reduces the weight of the lower spring seat 57 and also the weight of the suspension 1, compared with forming the entire lower spring seat 57 of metal.

Employing a resin as the material of the lower spring seat 57 enables the lower spring seat 57 to be formed into any desired shape in a mold, and thus, even if the inner prevention portion 628, the outer prevention portion 629, the protrusion portion 630 necessitate protruding or depressed shapes, these shapes are more easily formed. That is, in the case where the lower spring seat 57 is made of metal, it is necessary to make an uneven surface by pressing a metal plate using a plurality of molds in a plurality of steps. In contrast, the use of a resin as a part of the material of the lower spring seat 57 makes injection molding (injection molding) applicable, and this makes the lower spring seat 57 more easily formed than a lower spring seat 57 made of metal, even if an uneven, complicated shape is required.

Furthermore, the use of a resin increases the degree of freedom in shape, and thus the shapes of the inner prevention portion 628, the outer prevention portion 629, and the mounting surface 627 are more precisely adjusted to the shape of the lower end portion of the coil spring 30. This configuration prevents sand, for example, from entering the space between the coil spring 30 and the lower spring seat 57.

Also, when all part of the lower spring seat 57 is made of metal, in order to prevent sound caused by a direct contact with the metal coil spring 30, it is necessary to provide an elastic member such as rubber interposed between the lower spring seat 57 and the coil spring 30. However, in this embodiment, since the resin seat 620 exists at the portion to be in direct contact with the coil spring 30, it is not necessary to provide an elastic member.

The resin seat 620 includes the outer portion 625, which is disposed outside of the pressure mounting portion 624. As illustrated in FIG. 2, with the suspension 1 mounted on the vehicle, the outer portion 625 is disposed between the tire 112 and the coil spring 30. As a result, even if the coil spring 30 is broken, the outer portion 625 of the lower spring seat 57 keeps fragments of the coil spring 30 away from the tire 112.

The resin seat 620 according to this embodiment includes, on the side surface on the coil spring 30 side, the upper surface-side inclined rib 633 and the upper surface-side circumferential direction rib 634, which connect the outer portion 625 and the pressure mounting portion 624. Thus, the resin seat 620 according to this embodiment is higher in strength than in a configuration without the upper surface-side inclined rib 633 and the upper surface-side circumferential direction rib 634. As a result, even if fragments of the coil spring 30 come off, the resin seat 620 according to this embodiment receive the coming-off fragments of the coil spring 30.

Furthermore, the resin seat 620 according to this embodiment includes the lower surface-side inclined ribs 632, which extend from the outer portion 625 toward the load mounting portion 614 of the metal seat 610 on the side surface on the metal seat 610 side of the outer portion 625. Thus, in the resin seat 620 according to this embodiment, the force applied to the outer portion 625 is transmitted through the lower surface-side inclined rib 632 to the metal seat 610.

That is, the lower surface-side inclined rib 632, which extends from the side surface on the metal seat 610 side toward the metal seat 610 (inside in the radial direction) of the outer portion 625 (disposed outside in the radial direction of the resin seat 620), functions as an example of the transmission portion that transmits the force that the outer portion 625 receives to the metal seat 610. Therefore, since the force applied to the outer portion 625 caused by coming-off fragments of the coil spring 30 to the outer portion 625 is received by the metal seat 610, breakage of the outer portion 625 is prevented.

As a result, in the lower spring seat 57 according to this embodiment, bursting of the tire 112 caused by the fragments of the coil spring 30 stuck in the tire 112 is prevented.

Eighth Embodiment

Figure 30:
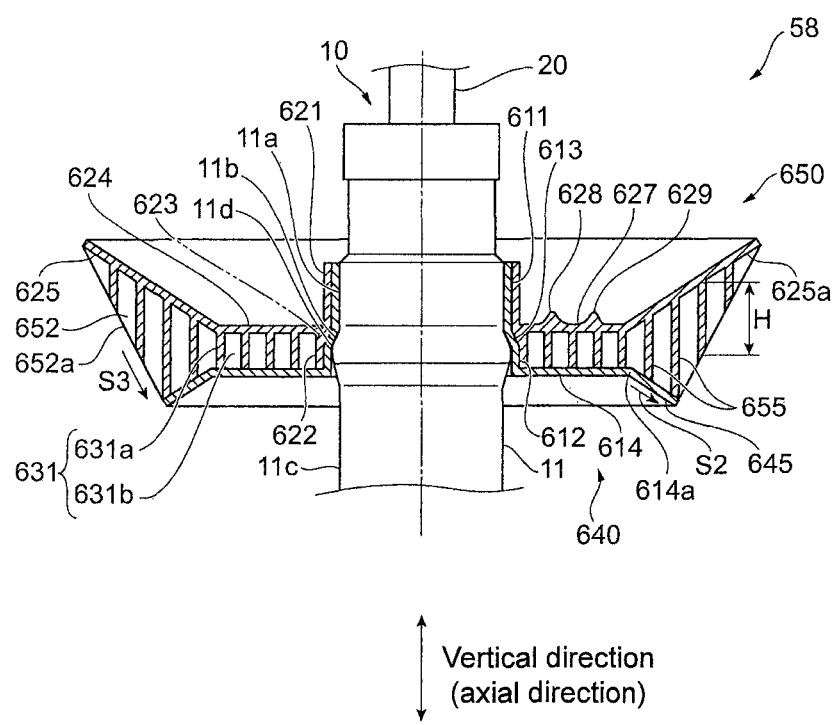
FIG. 30 is a cross-sectional view of a lower spring seat according to an eighth embodiment.

FIG. 30 is a cross-sectional view of the lower spring seat 58 according to an eighth embodiment.

Similarly to the lower spring seat 57 according to the seventh embodiment, the lower spring seat 58 according to the eighth embodiment includes a metal seat 640 and a resin seat 650. The following description will mainly focus on respects different from the seventh embodiment.

The metal seat 640 according to the eighth embodiment includes an outer inclined portion 645, which extends from the outermost diameter portion 614a of the load mounting portion 614 toward a diagonally downward direction (the direction of the arrow S2 in FIG. 30) with respect to the vertical direction.

The resin seat 650 according to the eighth embodiment includes a lower surface-side inclined rib 652, which extends from the side surface on the metal seat 610 side of the outer portion 625 toward the outer inclined portion 645 of the metal seat 640 so that a tip 652a is oriented in the diagonal direction (the direction of the arrow S3 in FIG. 30) with respect to the vertical direction. The lower surface-side inclined rib 652 is a rib formed so as to be continuous with the lower surface-side radial direction rib 631b of the lower rib 631. A plurality of lower surface-side inclined ribs 652 are provided in the circumferential direction.

The resin seat 650 according to the eighth embodiment includes an outer lower rib 655, which is an example of the second rib on the side surface on the wheel 110 side of the outer portion 625. The outer lower rib 655 is a rib extending downwardly from the side surface on the wheel 110 side of the outer portion 625.

The outer lower rib 655 is also a rib extending in the circumferential direction so as to connect the adjacent lower surface-side inclined ribs 652, and the outer lower rib 655 is provided plural in the radial direction. The height, H, of the outer lower rib 655 (protrusion length from the lower surface 625a of the outer portion 625) is the same as the height of the lower surface-side inclined rib 652.

The resin seat 650 does not include the upper surface-side inclined ribs 633 or the upper surface-side circumferential direction ribs 634 included in the resin seat 620 according to the seventh embodiment.

In the lower spring seat 58 according to the eighth embodiment as configured above, the plurality of lower surface-side inclined ribs 652 are provided on the side surface on the metal sheet 610 side of the outer portion 625 and extend from the outer portion 625 toward the outer inclined portion 645 of the metal seat 640. This configuration ensures that the force applied to the outer portion 625 is transmitted through the lower surface-side inclined rib 652 to the metal seat 640.

The outer lower rib 655 is provided to connect between the lower surface-side inclined ribs 652, and thus the lower surface-side inclined ribs 652 are reinforced. Since the force applied to the outer portion 625 caused by coming-off fragments of the coil spring 30 to the outer portion 625 is received by the metal seat 640, breakage of the outer portion 625 is prevented.

Therefore, in the lower spring seat 58 according to this embodiment as well, bursting of the tire 112 caused by the fragments of the coil spring 30 stuck in the tire 112 is prevented highly reliably.

Ninth Embodiment

Figure 31:
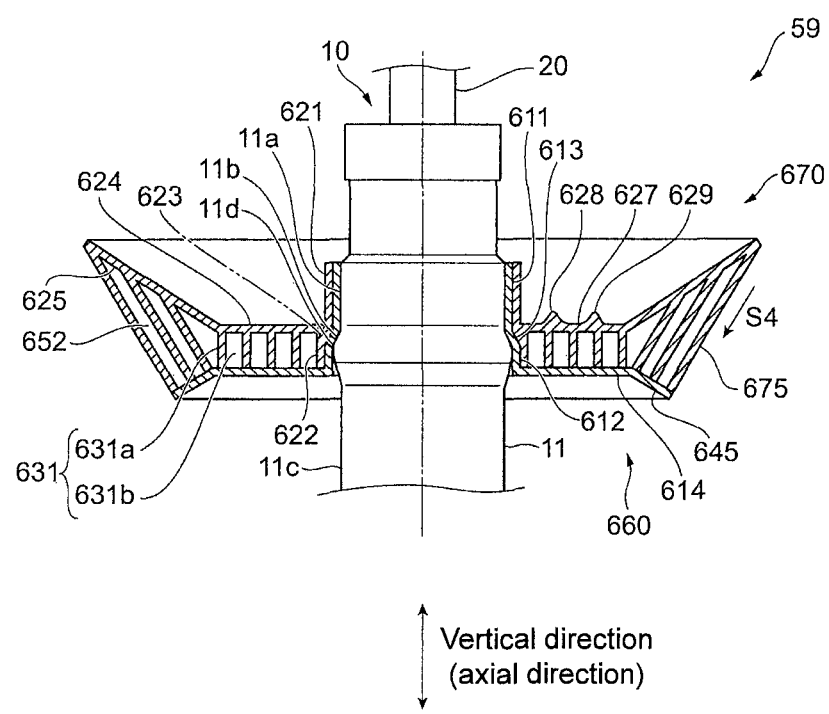
FIG. 31 is a cross-sectional view of a lower spring seat according to a ninth embodiment.

FIG. 31 is a cross-sectional view of a lower spring seat 59 according to a ninth embodiment.

The lower spring seat 59 according to the ninth embodiment includes: a metal seat 660, which is same as the metal seat 640 of the lower spring seat 58 according to the eighth embodiment; and a resin seat 670. The following description will mainly focus on respects different from the lower spring seat 58 according to the eighth embodiment.

The resin seat 670 according to the ninth embodiment includes an outer diagonal rib 675, which extends from the side surface on the metal seat 610 side of the outer portion 625 toward the outer inclined portion 645 of the metal seat 660 in a diagonal direction (the direction of the arrow S4 in FIG. 31) with respect to the vertical direction. The outer diagonal rib 675 is a rib that extends in the circumferential direction so as to connect between the adjacent lower surface-side inclined ribs 652. A plurality of outer diagonal ribs 675 are provided in the radial direction. The inclination angle of the outer diagonal portion 675 seen as a cross-sectional view illustrated in FIG. 31 is the angle that is approximately perpendicular to the outer inclined portion 645 of the metal seat 660. The resin seat 670 is formed so that the tip of the outer diagonal rib 675 is in contact with the outer inclined portion 645 of the metal seat 640.

The lower spring seat 59 according to the ninth embodiment includes the plurality of lower surface-side inclined ribs 652 and the plurality of outer diagonal ribs 675, which extend, on the side surface on the metal seat 660 side of the outer portion 625, from the outer portion 625 toward the outer inclined portion 645 of the metal seat 660. This configuration ensures that the force applied to the outer portion 625 is transmitted through the lower surface-side inclined rib 652 and the outer diagonal rib 675 to the metal seat 660. As a result, since the force applied to the outer portion 625 caused by coming-off fragments of the coil spring 30 to the outer portion 625 is received by the metal seat 660, breakage of the outer portion 625 is prevented.

Therefore, in the lower spring seat 59 according to this embodiment as well, bursting of the tire 112 caused by the fragments of the coil spring 30 stuck in the tire 112 is prevented more highly reliably.

<Modifications of the Resin Seat 650 According to the Eighth Embodiment and the Resin Seat 670 According to the Ninth Embodiment>

Figure 32A:
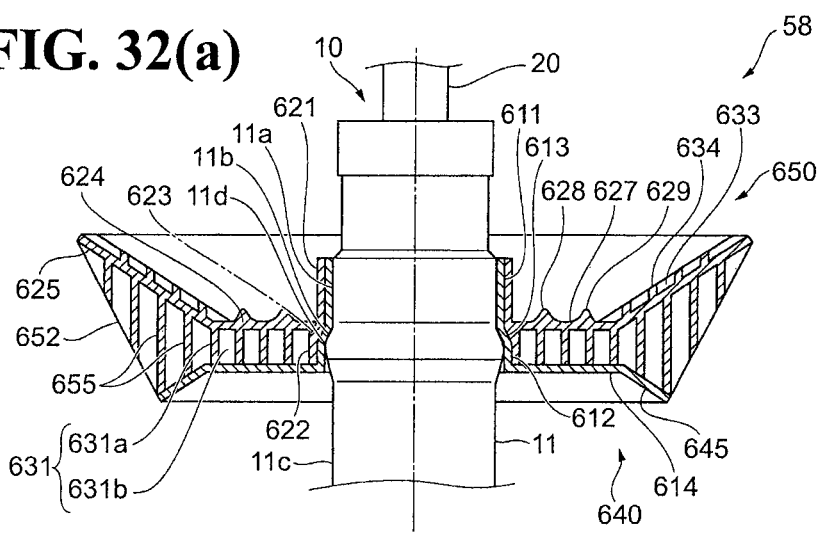
FIG. 32(a) is a cross-sectional view of a modification of a resin seat according to the eighth embodiment.
Figure 32B:
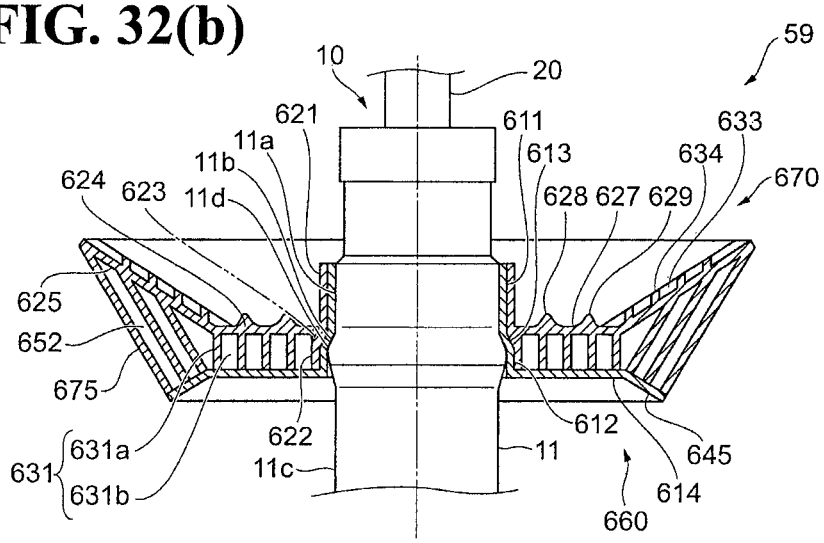
FIG. 32(b) is a cross-sectional view of a modification of the resin seat according to the ninth embodiment.

FIG. 32(*a*) is a cross-sectional view of a modification of the resin seat 650 according to the eighth embodiment. FIG. 32(*b*) is a cross-sectional view of a modification of the resin seat 670 according to the ninth embodiment.

As illustrated in FIG. 32(*a*) and FIG. 32(*b*), the resin seat 650 according to the eighth embodiment and the resin seat 670 according to the ninth embodiment as described above may include the upper surface-side inclined ribs 633 and the upper surface-side circumferential direction ribs 634, which are included in the resin seat 620 according to the seventh embodiment.

Accordingly, the upper surface-side inclined ribs 633 and the upper surface-side circumferential direction ribs 634, which are provided on the side surface on the coil spring 30 side, increase the strength of the resin seat 650 and the resin seat 670. As a result, even if fragments of the coil spring 30 come off, the resin seats 650 and 670 receive the coming-off fragments of the coil spring 30 more highly reliably.

<Modifications of the Position Deviation Prevention Mechanism 450>

In the embodiment described above, the position deviation prevention mechanism 450 includes the D-shaped portion 612 of the metal seat 610 and the D-shaped portion 622 of the resin seat 620, but is not particularly limited to such an embodiment. A modification of the position deviation prevention mechanism 450 will be described, taking the metal seat 610 and the resin seat 620 according to the seventh embodiment as an example, but is also similarly applicable to the metal seats and the resin seats according to the other embodiments.

Figure 33A:
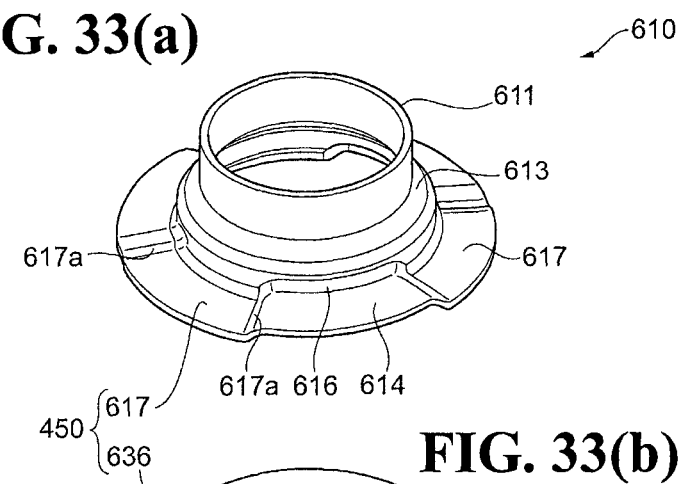
FIGS. 33(a) and 33(b) are views of a position deviation prevention mechanism according to the first modification.
Figure 33B:
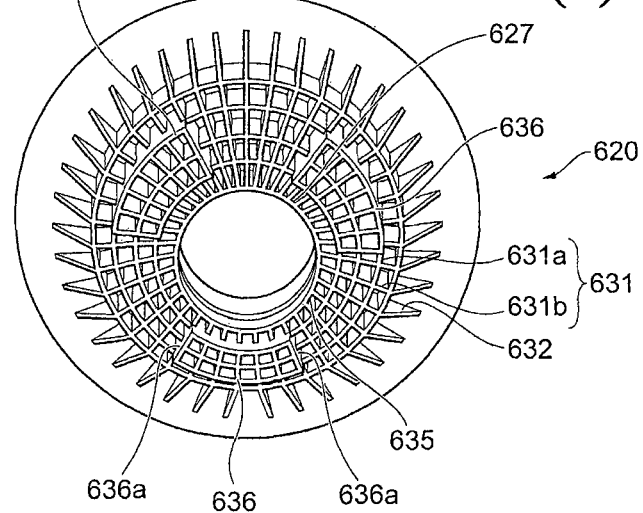

FIG. 33(a) and FIG. 33(b) are views of the position deviation prevention mechanism 450 according to the first modification. FIG. 33(a) is a perspective view of the metal seat 610 according to the first modification seen from above. FIG. 33(b) is a perspective view of the resin seat 620 according to the first modified modification seen from below.

As illustrated in FIG. 33(a), the metal seat 610 according to the first modification includes, instead of the D-shaped portion 612, a hollow circular columnar portion 616, which has a hollow circular columnar shape. The metal seat 610 according to the first modification is disposed at the load mounting portion 614 with a plurality of (three in this embodiment) depression portions 617, which are depressed downwardly over a predetermined area at equal intervals in the circumferential direction.

On the other hand, the resin seat 620 according to the first modification includes, instead of the D-shaped portion 622, a hollow circular columnar portion 635, which has a hollow circular columnar shape. The pressure mounting portion 624 of the resin seat 620 according to the first modification includes the lower protrusion portions 636 in which the tip of the lower rib 631 protrudes downwardly over a predetermined region in the circumferential direction. The plurality of (three in this embodiment) lower protrusion portions 636 are disposed over a predetermined area at equal intervals in the circumferential direction so as to fit the shape of the depression portion 616 of the metal seat 610.

The depression portion 617 of the metal seat 610 according to the first modification and the lower protrusion portion 636 of the resin seat 620 according to the first modification are disposed so as to be fitted to each other. In case where the resin seat 620 according to the first modification is subjected to circumferential load from the coil spring 30, a metal-side surface 617a and a resin-side surface 636a, which are surfaces facing each other in the circumferential direction and respectively correspond to the depression portion 617 and the lower protrusion portion 636, come into contact with each other. This configuration prevents movement in the circumferential direction of the resin seat 620 according to the first modification with respect to the metal seat 610 according to the first modification.

That is, the position deviation prevention mechanism 450 according to the first modification includes the depression portion 617 of the metal seat 610 according to the first modification and the lower protrusion portion 636 of the pressure mounting portion 624 of the resin seat 620 according to the first modification.

Figure 34A:
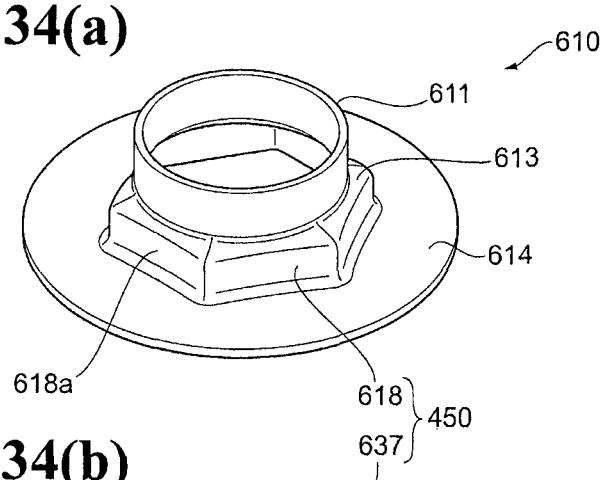
FIGS. 34(a) and 34(b) are views of a position deviation prevention mechanism according to the second modification.
Figure 34B:
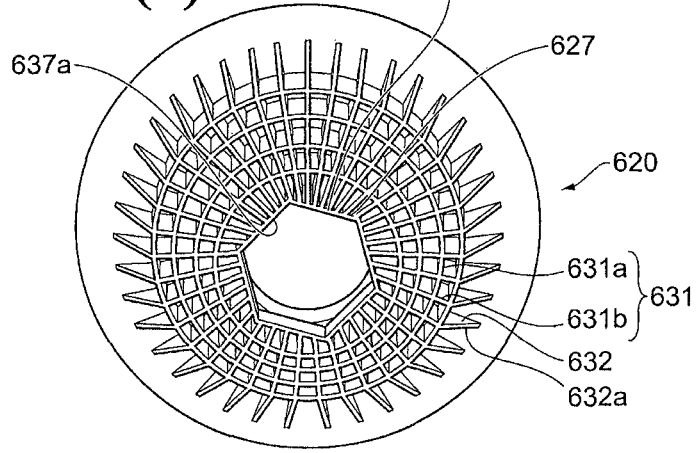

FIG. 34(a) and FIG. 34(b) are views of the position deviation prevention mechanism 450 according to the second modification. FIG. 34(a) is a perspective view of the metal seat 610 according to the second modification seen from above. FIG. 34(b) is a perspective view of the resin seat 620 according to the second modification seen from below.

As illustrated in FIG. 34(a), the metal seat 610 according to the second modification includes, instead of the D-shaped portion 612 described above, a metal-side hexagonal hollow columnar portion 618, which has a hexagonal hollow columnar shape.

On the other hand, the resin seat 620 according to the second modification includes, instead of the second circular hollow columnar portion 622 as described above, a resin-side hexagonal hollow columnar portion 637, which has a hexagonal hollow columnar shape.

The metal-side hexagonal hollow columnar portion 618 of the metal seat 610 according to the second modification and the resin-side hexagonal hollow columnar portion 637 of the resin seat 620 according to the second modification are fitted to each other. A resin-side rectangular surface 637a, which is in a direction perpendicular to the radial direction, of the resin-side hexagonal hollow columnar portion 637 of the resin seat 520 according to the second modification faces a metal-side rectangular surface 618a, which is in a direction perpendicular to the radial direction, of the metal-side hexagonal hollow columnar portion 618 of the metal seat 610 according to the second modification. In case where the resin seat 620 according to the second modification is subjected to circumferential load from the coil spring 30, the resin-side rectangular surface 637a and the metal-side rectangular surface 618a, which face each other in the radial direction, come into contact with each other. This configuration prevents movement in the circumferential direction of the resin seat 620 according to the second modification with respect to the metal seat 610 according to the second modification.

That is, the position deviation prevention mechanism 450 according to the second modification includes the metal-side hexagonal hollow columnar portion 618 of the metal seat 610 according to the second modification and the resin-side hexagonal hollow columnar portion 637 of the resin seat 620 according to the second modification.

Figure 35A:
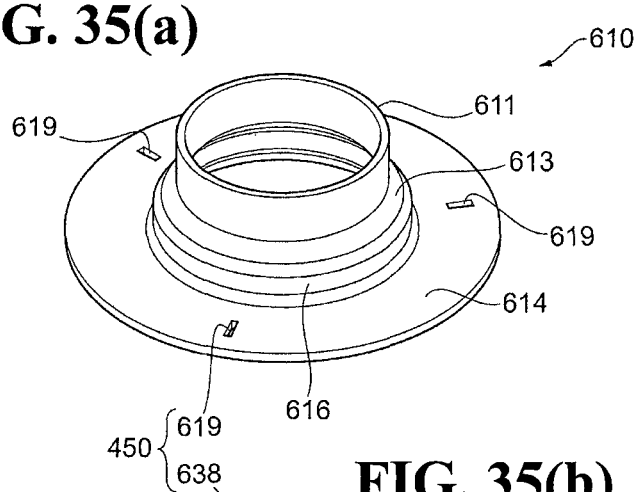
FIGS. 35(a) and 35(b) are views of a position deviation prevention mechanism according to the third modification.
Figure 35B:
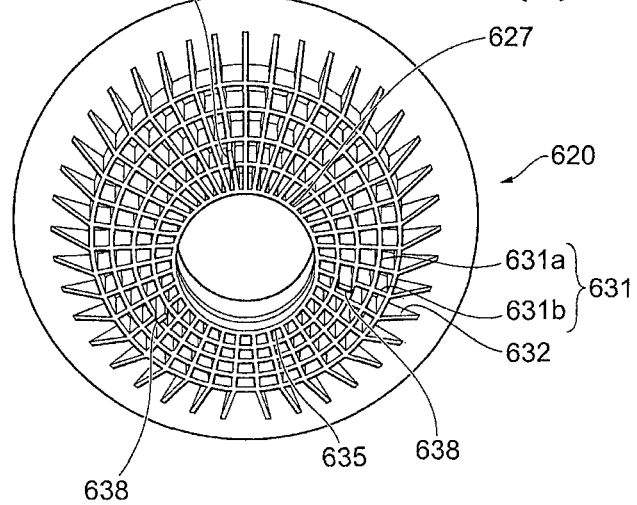

FIG. 35(a) and FIG. 35(b) are views of the position deviation prevention mechanism 450 according to the third modification. FIG. 35(a) is a perspective view of the metal seat 610 according to the first modification seen from above. FIG. 35(b) is a perspective view of the resin seat 620 according to the first modification seen from below.

As illustrated in FIG. 35(a), the metal seat 610 according to the third modification includes, instead of the D-shaped portion 612, the hollow circular columnar portion 616, which has a hollow circular columnar shape. In the metal seat 610 according to the third modification, a plurality of (three in this embodiment) through holes 619, which penetrate the load mounting portion 614 in the vertical direction, are formed in the circumferential direction. The through hole 619 is, as illustrated in FIG. 35(a), a rectangle with a longer side in the radial direction and a shorter side in the circumferential direction.

On the other hand, the resin seat 620 according to the third modification includes, instead of the D-shaped portion 622, a hollow circular columnar portion 635, which has a hollow circular columnar shape. The resin seat 620 according to the third modification includes a lower protrusion portion 638, in which the tip of the lower surface-side radial direction rib 631b of the lower rib 631 of the pressure mounting portion 624 protrudes downwardly. The lower protrusion portion 638 has a smaller shape than the through hole 619 of the metal seat 610. The plurality of (three in this embodiment) lower protrusion portions 638 are aligned at equal intervals in the circumferential direction.

The through hole 619 of the metal seat 610 according to the third modification and the lower protrusion portion 638 of the resin seat 620 according to the third modification are disposed so as to be fitted to each other. In case where the resin seat 620 according to the third modification is subjected to circumferential load from the coil spring 30, the through hole 619 and the lower protrusion portion 638 come into contact with each other. This configuration prevents movement in the circumferential direction of the resin seat 620 according to the third modification with respect to the metal seat 610 according to the third modification.

That is, the position deviation prevention mechanism 450 according to the third modification includes the through holes 619 of the metal seat 610 according to the third modification and the lower protrusion portion 639 of the pressure mounting portion 624 of the resin seat 620 according to the third modification.

The modification of the above described position deviation prevention mechanism 450 also ensures a weight reduction by constituting the lower spring seat 57 using the metal seat 610 and the resin seat 620, and more highly reliably prevents generation of sound caused by the relative movement of the resin seat 620 to the metal seat 610.

Figure 36:
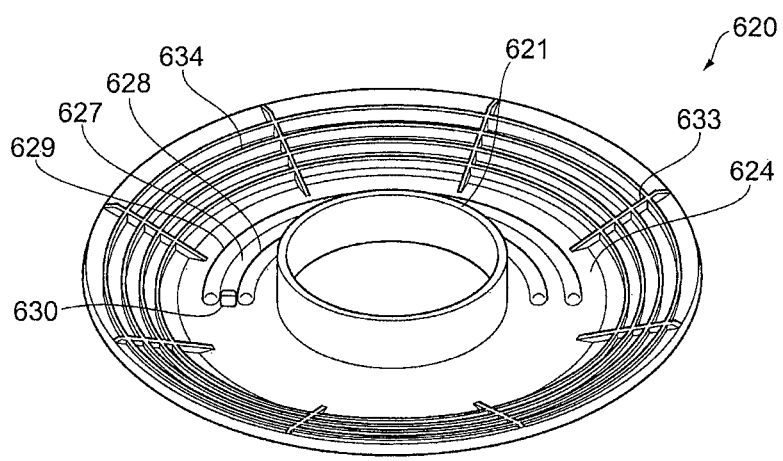
FIG. 36 is a view of a modification of the resin seat.

FIG. 36 is a view of a modification of the resin seat 620. FIG. 36 is a perspective view of the resin seat 620 seen from above.

The resin seats 620, 650, and 670 as described above include the discharge hole 624h, the discharge hole 625h, and the slit 634s to discharge liquid that may accumulate on the side surface on the coil spring 30 side. The discharge hole 624h, the discharge hole 625h, and the slit 634s discharge liquid from the side surface on the coil spring 30 side to the wheel side. However, as illustrated in FIG. 36, the resin seats 620, 650, and 670 may be without the discharge hole 624h, the discharge hole 625h, or the slit 634s. Without forming the discharge hole 624h, the discharge hole 625h, or the slit 634s, the strengths of the resin seats 620, 650, and 670 increase.

Figure 37:
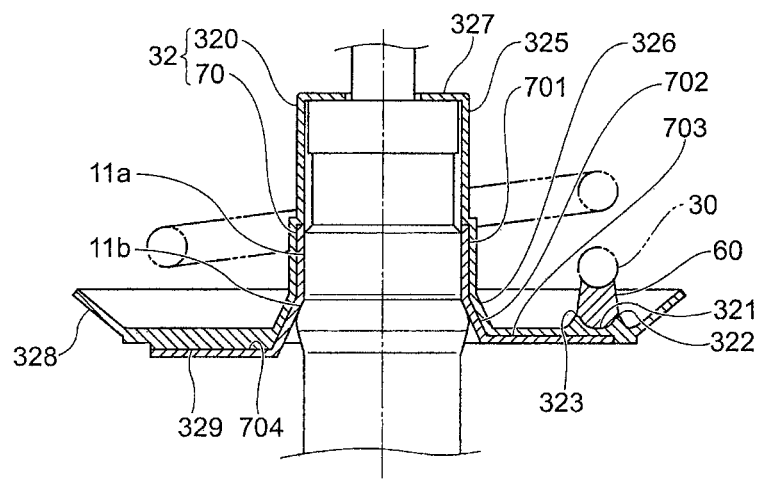
FIG. 37 is a view of a modification of the suspension.

FIG. 37 is a view of a modification of the suspension 1.

The suspension 1 described above has such a configuration that the lower spring seat 31, which is made of resin, the lower spring seat bodies 320 and 330, the resin seats 520, 550, 570, 620, 650, and 670 are in direct contact with the coil spring 30. However, the suspension 1 may include, as illustrated in FIG. 37, an elastic member 60 such as a rubber between the lower spring seat 31, the lower spring seat bodies 320 and 330, the resin seats 520, 550, 570, 620, 650, and 670, and the coil spring 30.

In the first to ninth embodiments described above, examples in which the lower spring seats 31 to 34 and 55 to 59 are applied to the suspension 1 as the MacPherson strut suspension. This configuration, however, should not be construed in a limiting sense. The lower spring seats 31 to 34 and 55 to 59 according to the first to ninth embodiments may be applied to, for example, a wishbone type suspension to obtain similar advantageous effects to the advantageous effects described above.

The invention claimed is:

1. A spring seat mounted on a cylinder comprising a damper device to support a wheel-side end portion of a spring disposed between a vehicle body and a wheel, the spring seat comprising:
 a spring seat body; and
 a metal reinforcing member, wherein
 the spring seat body includes;
  a mounting portion on which the wheel-side end portion of the spring rests; and
  an intermediate portion disposed on a side of the mounting portion opposite to the cylinder and disposed between the spring and the wheel,
 the mounting portion and the intermediate portion are each made of a resin material,
 the metal reinforcing member is provided at the mounting portion on a side of the wheel to receive a load of the spring, and is not provided at the intermediate portion,
 a lower end surface of the spring seat body abuts an upper end surface of the reinforcing member so that a rotation of the spring seat body is prevented from moving in a circumferential direction of the cylinder with respect to the metal reinforcing member, said lower end surface facing away from the spring, and
 a strengthening member made of a material having a higher strength than a material of the mounting portion is disposed within the mounting portion.

2. The spring seat according to claim 1, wherein the intermediate portion comprises
 an outer portion disposed at an outside in a radial direction of the mounting portion, and
 a supporting portion connected to the outer portion and supported by the reinforcing member.

3. The spring seat according to claim 2, wherein the outer portion is inclined from a surface of the mounting portion on a side of the spring toward a side of the vehicle body.

4. The spring seat according to claim 1, further comprising a position deviation prevention mechanism configured to prevent a position deviation between at least two adjacent members among the mounting portion, the reinforcing member, and the cylinder.

5. The spring seat according to claim 4, wherein the position deviation prevention mechanism comprises:
 a protrusion portion disposed at one of the reinforcing member and the mounting portion and protruding in an axial direction of the cylinder, and
 a depression portion disposed at another one of the reinforcing member and the mounting portion and depressed in the axial direction to be fitted with the protrusion portion.

6. The spring seat according to claim 4, wherein the position deviation prevention mechanism prevents a position deviation between the mounting portion and the reinforcing member, and prevents a position deviation between the reinforcing member and the cylinder.

7. The spring seat according to claim 4, wherein the position deviation prevention mechanism comprises
 a first rectangle disposed at one of the reinforcing member and a member comprising the mounting portion, and
 a second rectangle disposed at another one of the reinforcing member and the member and facing the first rectangle to be fitted with the first rectangle.

8. The spring seat according to claim 1, wherein a lower end surface of the reinforcing member comprises an exposed surface that faces away from the spring.

9. The spring seat according to claim 1, wherein another strengthening member made of a material having a higher strength than a material of the intermediate portion is disposed within the intermediate portion.

* * * * *